United States Patent
Lei et al.

(10) Patent No.: US 12,273,706 B2
(45) Date of Patent: Apr. 8, 2025

(54) METHOD, SYSTEM, AND APPARATUS FOR DETERMINING USER PLANE SECURITY ALGORITHM

(71) Applicant: HUAWEI TECHNOLOGIES CO., LTD., Shenzhen (CN)

(72) Inventors: Ao Lei, Beijing (CN); He Li, Shanghai (CN); Yizhuang Wu, Beijing (CN); Rong Wu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 247 days.

(21) Appl. No.: 18/164,697

(22) Filed: Feb. 6, 2023

(65) Prior Publication Data
US 2023/0179997 A1    Jun. 8, 2023

Related U.S. Application Data

(63) Continuation of application No. PCT/CN2021/110907, filed on Aug. 5, 2021.

(30) Foreign Application Priority Data

Aug. 6, 2020 (CN) ......................... 202010785355.1

(51) Int. Cl.
| | | |
|---|---|---|
| H04L 29/06 | (2006.01) | |
| H04W 12/033 | (2021.01) | |
| H04W 12/037 | (2021.01) | |

(52) U.S. Cl.
CPC ....... *H04W 12/033* (2021.01); *H04W 12/037* (2021.01)

(58) Field of Classification Search
None
See application file for complete search history.

(56) References Cited

U.S. PATENT DOCUMENTS

| | | | | |
|---|---|---|---|---|
| 10,341,868 | B2 * | 7/2019 | Ross | ............ H04L 41/0803 |
| 10,667,126 | B2 * | 5/2020 | Wifvesson | ............ H04W 12/08 |

(Continued)

FOREIGN PATENT DOCUMENTS

| | | |
|---|---|---|
| CN | 102014381 B | 12/2012 |
| CN | 107567018 A | 1/2018 |

(Continued)

OTHER PUBLICATIONS

Orhanou, Ghizlane et al. Integrity protection in UMTS Radio Access Network—Simulation approach under OPNET. 2012 International Conference on Multimedia Computing and Systems. https://ieeexplore.ieee.org/stamp/stamp.jsp?tp=&arnumber=6320127 (Year: 2012).*

(Continued)

*Primary Examiner* — Jeremiah L Avery
(74) *Attorney, Agent, or Firm* — Maier & Maier, PLLC

(57) ABSTRACT

A method for determining a user plane security algorithm, a system, and an apparatus. The method may include: a second device selects a non-null user plane confidentiality protection algorithm based on a security capability of a first device and a security capability of the second device in a case in which user plane confidentiality protection between the second device and the first device is enabled and control plane confidentiality protection between the second device and the first device is not enabled. The second device sends a first message to the first device. The first message includes first algorithm indication information indicating the user plane confidentiality protection algorithm. Therefore, the first device can obtain the non-null user plane confidentiality protection algorithm. Embodiments can be adopted to determine an effective user plane confidentiality protection algorithm, for confidentiality protecting user plane data.

5 Claims, 6 Drawing Sheets

(56) References Cited

U.S. PATENT DOCUMENTS

| | | | | |
|---|---|---|---|---|
| 2015/0143463 | A1* | 5/2015 | Baghel | H04L 63/04 |
| | | | | 726/3 |
| 2016/0029213 | A1* | 1/2016 | Rajadurai | H04L 63/0876 |
| | | | | 380/283 |
| 2016/0165491 | A1* | 6/2016 | Liu | H04W 12/04 |
| | | | | 370/331 |
| 2016/0249209 | A1 | 8/2016 | Zhang et al. | |
| 2018/0083972 | A1* | 3/2018 | Kim | H04L 41/0853 |
| 2018/0359642 | A1* | 12/2018 | Torvinen | H04W 12/041 |
| 2019/0082325 | A1* | 3/2019 | Muhanna | H04W 12/04 |
| 2019/0104447 | A1* | 4/2019 | Horn | H04W 36/0038 |
| 2019/0149997 | A1* | 5/2019 | Liao | H04W 76/15 |
| | | | | 455/411 |
| 2019/0215693 | A1* | 7/2019 | Lee | H04L 63/205 |
| 2019/0246282 | A1 | 8/2019 | Li et al. | |
| 2019/0313248 | A1* | 10/2019 | Middelesch | H04W 36/0038 |
| 2020/0015088 | A1* | 1/2020 | Luo | H04W 12/041 |
| 2020/0037165 | A1* | 1/2020 | Kunz | H04W 12/106 |
| 2020/0120552 | A1* | 4/2020 | Yang | H04W 36/0069 |
| 2020/0128398 | A1* | 4/2020 | Wifvesson | H04W 12/10 |
| 2020/0221298 | A1* | 7/2020 | Pan | H04W 12/50 |

FOREIGN PATENT DOCUMENTS

| | | | |
|---|---|---|---|
| CN | 109561427 | A | 4/2019 |
| CN | 110121168 | A | 8/2019 |
| CN | 110830993 | A | 2/2020 |
| KR | 1020190018720 | A | 2/2019 |

OTHER PUBLICATIONS

Huang, Qiang; Shen, Changxiang. A new MLS mandatory policy combining secrecy and integrity implemented in highly classified secure level OS. Proceedings 7th International Conference on Signal Processing, 2004. Proceedings. ICSP '04. 2004.https://ieeexplore.ieee.org/stamp/stamp.jsp?tp=&arnumber=1442266 (Year: 2004).*

Ben Hadj Said, Siwar et al. Towards adaptive security mechanisms in 3GPP EPS/LTE networks. 2013 IEEE Wireless Communications and Networking Conference (WCNC). https://ieeexplore.ieee.org/stamp/stamp.jsp?tp=&arnumber=6554850 (Year: 2013).*

"3rd Generation Partnership Project; Technical Specification Group Services and System Aspects; Security aspects of 3GPP support for advanced Vehicle-to-Everything (V2X) services(Release 16)", 3GPP TS 33.536 V16.0.0 (Jul. 2020), 23 pages.

"3rd Generation Partnership Project; Technical Specification Group Core Network and Terminals; Vehicle-to-Everything (V2X) services in 5G System (5GS); Stage 3(Release 16)", 3GPP TS 24.587 V16.1.1 (Jul. 2020), 101 pages.

Qualcomm Incorporated, "Proposed text for security establishment clause of NR PC5 unicast security". 3GPP TSG-SA3 Meeting #98e, e-meeting, Mar. 2-6, 2020, S3-200347, 5 pages.

Qualcomm Incorporated et al., "Proposed text for security establishment clause of NR PC5 unicast security". 3GPP TSG-SA3 Meeting #98e, e-meeting, Mar. 2-6, 2020, S3-200507, 5 pages.

* cited by examiner

METHOD, SYSTEM, AND APPARATUS FOR DETERMINING USER PLANE SECURITY ALGORITHM

CROSS-REFERENCE TO RELATED APPLICATIONS

This application is a continuation of International Application No. PCT/CN2021/110907, filed on Aug. 5, 2021, which claims priority to Chinese Patent Application No. 202010785355.1, filed on Aug. 6, 2020. The disclosures of the aforementioned applications are hereby incorporated by reference in their entireties.

TECHNICAL FIELD

The embodiments relate to the field of communication technologies, and a method, a system, and an apparatus for determining a user plane security algorithm.

BACKGROUND

There are two communication modes for a terminal device: Uu communication and PC5 unicast communication. Uu communication refers to a mode in which a terminal device communicates with a base station through a Uu interface. In conventional cellular network communication, terminal devices may not directly communicate with each other, and any piece of signaling sent between the terminal devices is processed by a base station for forwarding. Being processed by the base station indicates that the terminal device communicates with the base station through a Uu interface. However, to meet device-to-device (D2D) short-distance direct communication demands and vehicle-to-everything (V2X) short-distance direct communication demands, a PC5 interface based on short-distance direct communication between terminal devices is provided in the D2D technology. PC5 unicast communication refers to a mode in which terminal devices directly communicate with each other through a PC5 interface, and data and signaling are not transmitted via a base station. Both the communication modes relate to control plane security protection and user plane security protection. Control plane security protection refers to whether control plane integrity protection is enabled and whether control plane confidentiality protection is enabled. User plane security protection refers to whether user plane integrity protection is enabled and whether user plane confidentiality protection is enabled.

Currently, in the 5G V2X standard in which it is defined to use PC5 communication in a V2X scenario, when both control plane security protection and user plane security protection are enabled, a security algorithm used by a user plane is consistent with a security algorithm negotiated by a control plane. For example, when both control plane integrity protection and control plane confidentiality protection are enabled, terminal devices at both ends determine, through negotiation, that the control plane uses a non-null (non-null) integrity protection algorithm and a non-null confidentiality protection algorithm. When both user plane integrity protection and user plane confidentiality protection are enabled, a security algorithm used by the user plane is consistent with a security algorithm negotiated by the control plane. When control plane integrity protection is not enabled, neither control plane confidentiality protection nor user plane security protection is enabled. However, when control plane integrity protection is enabled, there is no coupling relationship between control plane security protection and user plane security protection. For example, when control plane integrity protection is enabled, control plane confidentiality protection may be enabled or not enabled, user plane integrity protection may be enabled or not enabled, and user plane confidentiality protection may be enabled or not enabled. A security algorithm used for a PC5 unicast communication is negotiated when a control plane security enabling manner is negotiated, and a user plane security enabling manner is negotiated after the control plane security enabling manner is negotiated. Therefore, when a control plane security protection negotiation result is that control plane confidentiality protection is not enabled, a null (null) algorithm is correspondingly selected as a confidentiality protection algorithm for the PC5 unicast communication, and UEs at both ends may fail to confidentiality protect, after a user plane security protection negotiation result subsequently becomes that confidentiality protection is enabled, user plane data by using an effective confidentiality protection algorithm.

Therefore, how to determine an effective user plane confidentiality protection algorithm is an urgent problem to be resolved.

SUMMARY

The embodiments may provide a method, a system, and an apparatus for determining a user plane security algorithm, to determine an effective user plane confidentiality protection algorithm, for confidentiality protecting user plane data.

A first aspect provides a method for determining a user plane security algorithm. This method can be performed by a second device or may be performed by an apparatus (for example, a processor or a chip) in a second device. This method includes the following content by using the second device as an example.

The second device selects a non-null user plane confidentiality protection algorithm based on a security capability of a first device and a security capability of the second device in a case in which user plane confidentiality protection between the second device and the first device is enabled and control plane confidentiality protection between the second device and the first device is not enabled, and sends a first message to the first device. The first message includes first algorithm indication information indicating the user plane confidentiality protection algorithm.

According to the first aspect, when user plane confidentiality protection between the second device and the first device is enabled, and control plane confidentiality protection between the second device and the first device is not enabled, the second device selects the non-null user plane confidentiality protection algorithm based on the security capability of the first device and the security capability of the second device, and notifies the first device of the non-null user plane confidentiality protection algorithm via the first algorithm indication information. Therefore, when user plane confidentiality protection is enabled, the first device can confidentiality protect user plane data by using the non-null user plane confidentiality protection algorithm.

In a possible implementation, the first message further includes indication information indicating to enable user plane confidentiality protection between the second device and the first device, so that the first device enables user plane confidentiality protection between the first device and the second device based on the indication information.

In a possible implementation, the second device receives a second message from the first device, where the second message includes a user plane security policy of the first device, and determines, based on the user plane security policy of the first device and a user plane security policy of the second device, that user plane confidentiality protection between the second device and the first device is enabled. For example, when the user plane security policy of the first device is that user plane confidentiality protection is required, and the user plane security policy of the second device is that user plane confidentiality protection is required, the second device determines that user plane confidentiality protection between the second device and the first device is enabled. In another example, when the user plane security policy of the first device is that user plane confidentiality protection is preferred, and the user plane security policy of the second device is that user plane confidentiality protection is preferred, the second device may determine, based on a preset policy, for example, a load status of the second device, that user plane confidentiality protection between the second device and the first device is enabled.

In a possible implementation, before the second device receives a second message from the first device, the second device receives a third message from the first device. The third message includes a control plane security policy of the first device and the security capability of the first device. The second device determines, based on the control plane security policy of the first device and a control plane security policy of the second device, that control plane confidentiality protection between the second device and the first device is not enabled. For example, when the control plane security policy of the first device is that control plane confidentiality protection is not needed (not needed), and/or the user plane security policy of the second device is that control plane confidentiality protection is not needed, the second device determines that control plane confidentiality protection between the second device and the first device is not enabled. In another example, when the user plane security policy of the first device is that user plane confidentiality protection is preferred, and the user plane security policy of the second device is that user plane confidentiality protection is preferred, the second device may determine, based on a preset policy, for example, a load status of the second device, that user plane confidentiality protection between the second device and the first device is not enabled.

In a possible implementation, the second device further selects a null control plane confidentiality protection algorithm based on that control plane confidentiality protection between the second device and the first device is not enabled, and sends a fourth message to the first device. The fourth message includes indication information indicating the null control plane confidentiality protection algorithm, so that the first device does not enable control plane confidentiality protection between the first device and the second device based on the indication information.

In a possible implementation, when receiving the third message, the second device may store the security capability of the first device. When control plane confidentiality protection between the second device and the first device is not enabled, the second device stores the security capability of the first device, so that the first device does not need to send the security capability of the first device again when negotiating a user plane confidentiality protection algorithm, thereby reducing signaling overheads.

A second aspect provides a method for determining a user plane security algorithm. This method can be performed by a first device or may be performed by an apparatus (for example, a processor or a chip) in a first device. This method includes the following content by using the first device as an example.

The first device sends a third message to a second device. The third message includes a control plane security policy of the first device and a security capability of the first device. The first device receives a fourth message from the second device. The fourth message includes indication information indicating a null control plane confidentiality protection algorithm. The first device sends a second message to the second device. The second message includes a user plane security policy of the first device. The first device receives a first message from the second device. The first message includes first algorithm indication information indicating a non-null user plane confidentiality protection algorithm. The first device confidentiality protects user plane data between the first device and the second device based on the user plane confidentiality protection algorithm indicated by the first algorithm indication information.

According to the second aspect, the first device determines, based on the null control plane confidentiality protection algorithm, that control plane confidentiality protection between the first device and the second device is not enabled, and obtains an effective user plane confidentiality protection algorithm based on the non-null user plane confidentiality protection algorithm indicated by the first algorithm indication information, so that confidentiality protection can be performed on the user plane data.

In a possible implementation, the first message further includes indication information indicating to enable user plane confidentiality protection between the second device and the first device, so that the first device enables user plane confidentiality protection between the first device and the second device based on the indication information.

In a possible implementation, the fourth message further includes indication information indicating a control plane integrity protection algorithm. Before the confidentiality protecting, by the first device, user plane data between the first device and the second device based on the user plane confidentiality protection algorithm indicated by the first algorithm indication information, the first device enables control plane integrity protection between the first device and the second device based on the control plane integrity protection algorithm indicated by the indication information of the control plane integrity protection algorithm, performs integrity verification on the first message, and enables, when the first message is successfully verified, user plane confidentiality protection between the first device and the second device based on the user plane confidentiality protection algorithm indicated by the first algorithm indication information. The first device performs integrity protection verification on the first message, to reduce a risk of tampering with the first message.

When the methods provided in the first aspect and the second aspect are applied to PC5 unicast communication, the first message may be a direct communication accept message, the second message may be a direct security mode complete message, the third message may be a direct communication request message, and the fourth message may be a direct mode command message.

A third aspect provides a method for determining a user plane security algorithm. The method may be applied to a communication scenario such as PC5 unicast communication. This method can be performed by a second device or may be performed by an apparatus (for example, a processor or a chip) in a second device. This method includes the following content by using the second device as an example.

When receiving a direct security command complete message from a first device, the second device determines that a user plane security protection mode between the second device and the first device includes that user plane confidentiality protection is enabled. The second device selects a user plane security algorithm based on the user plane security protection mode, a security capability of the first device, and a security capability of the second device, and sends, to the first device, a direct communication accept message including first algorithm indication information. The first algorithm indication information indicates the selected user plane security algorithm. The user plane security algorithm includes a non-null user plane confidentiality protection algorithm.

According to the third aspect, when determining that the user plane security protection mode includes that user plane confidentiality protection is enabled, the second device selects the non-null user plane confidentiality protection algorithm based on the user plane security protection mode, the security capability of the first device, and the security capability of the second device, and notifies the first device of the non-null user plane confidentiality protection algorithm via the first algorithm indication information. Therefore, when user plane confidentiality protection is enabled, the first device can confidentiality protect user plane data by using the non-null user plane confidentiality protection algorithm.

In a possible implementation, when the user plane security protection mode is inconsistent with a control plane security protection mode, the second device selects the user plane security algorithm based on the user plane security protection mode, the security capability of the first device, and the security capability of the second device. In this way, even if the user plane security protection mode is inconsistent with the control plane security protection mode, the second device can select the user plane security algorithm, to determine an effective user plane security algorithm, for performing security protection on the user plane data.

In a possible implementation, that the user plane security protection mode is inconsistent with the control plane security protection mode may include that control plane integrity protection is enabled and that control plane confidentiality protection is not enabled, and the user plane security protection mode includes that user plane confidentiality protection is enabled. Even if control plane confidentiality protection is not enabled, a non-null user plane confidentiality protection algorithm can be selected, so that confidentiality protection can be performed on user plane data.

In a possible implementation, when determining the user plane security protection mode, the second device may further generate user plane security enabling indication information based on the user plane security protection mode. The user plane security enabling indication information indicates the determined user plane security protection mode.

Further, the direct communication accept message further includes the user plane security enabling indication information, so that the first device can obtain the user plane security protection mode by using the user plane security enabling indication information.

In a possible implementation, the direct security command complete message includes a user plane security policy of the first device. The second device determines, based on the user plane security policy of the first device and a user plane security policy of the second device, that the user plane security protection mode between the second device and the first device includes that user plane confidentiality protection is enabled.

In a possible implementation, the direct security command complete message further includes the security capability of the first device, to help the second device to select the user plane security algorithm. Alternatively, the direct security command complete message may not include the security capability of the first device. In this case, when needing to select the user plane security algorithm, the second device extracts the security capability of the first device from information stored in the second device, and selects the user plane security algorithm based on the security capability of the first device, the security capability of the second device, and the user plane security protection mode.

In a possible implementation, when the control plane security algorithm does not support the user plane security protection mode, the second device selects the user plane security algorithm based on the user plane security protection mode, the security capability of the first device, and the security capability of the second device. In this way, even if the control plane security algorithm does not support the user plane security protection mode, the second device can select the user plane security algorithm, to determine an effective user plane security algorithm, for performing security protection on the user plane data.

The control plane security algorithm does not support the user plane security protection mode. For example, when the control plane confidentiality protection algorithm is a null value, and user plane confidentiality protection needs to be enabled, the control plane confidentiality protection algorithm does not support enabling of user plane confidentiality protection.

In a possible implementation, before receiving a direct security command complete message from the first device, the second device further negotiates a control plane security algorithm.

The second device may receive, from the first device, a direct communication request message including a control plane security policy of the first device and the security capability of the first device. The second device determines a control plane security protection mode between the second device and the first device based on the control plane security policy of the first device and a control plane security policy of the second device. Further, the second device selects a control plane security algorithm based on the control plane security protection mode, the security capability of the first device, and the security capability of the second device, and sends, to the first device, a direct security mode command message including second algorithm indication information indicating the selected control plane security algorithm.

When receiving the security capability of the first device, the second device may store the security capability of the first device. In this way, when sending the direct security command complete message, the first device does not need to include the security capability of the first device in the direct security command complete message.

A fourth aspect provides a method for determining a user plane security algorithm. The method may be applied to a communication scenario such as PC5 unicast communication. This method can be performed by a first device or may be performed by an apparatus (for example, a processor or a chip) in a first device. This method includes the following content by using the first device as an example.

The first device receives a direct communication accept message from the second device. The direct communication accept message includes user plane security enabling indication information and first algorithm indication information indicating a user plane security algorithm. The first device determines a user plane security protection mode between the first device and the second device based on the user plane security enabling indication information, and performs user plane security protection on user plane data between the first device and the second device based on the user plane security protection mode and the user plane security algorithm indicated by the first algorithm indication information.

According to the fourth aspect, the user plane security protection mode is indicated by using the user plane security enabling indication information, and the user plane security algorithm is indicated by using the first algorithm indication information, so that security protection can be performed on the user plane data.

In a possible implementation, before determining the user plane security algorithm, the first device performs control plane negotiation with the second device, to determine a control plane security algorithm and a control plane security protection mode. The control plane security algorithm is determined based on a direct security mode command message received from the second device. The direct security mode command message includes second algorithm indication information indicating the control plane security algorithm.

In a possible implementation, when control plane integrity protection is enabled, the first device performs integrity protection verification on the direct security mode command message. When the integrity protection verification on the direct security mode command message succeeds, the first device determines the control plane security protection mode between the first device and the second device based on the control plane security algorithm indicated by the second algorithm indication information.

In a possible implementation, the first device sends a direct security command complete message to the second device. The direct security command complete message includes a user plane security policy of the first device, to help the second device to determine the user plane security protection mode based on the user plane security policy of the first device and a user plane security policy of the second device.

In a possible implementation, the direct security command complete message further includes a security capability of the first device, to help the second device to select the control plane security algorithm based on the security capability of the first device and a security capability of the second device. The second device may store the security capability of the first device. In this way, when needing to select the user plane security algorithm, the second device can directly obtain the security capability of the first device, and the first device does not need to send the security capability of the first device again, thereby reducing signaling overheads.

A fifth aspect provides a method for determining a user plane security algorithm. The method may be applied to communication scenarios such as PC5 unicast communication and Uu communication. This method can be performed by a first device or may be performed by an apparatus (for example, a processor or a chip) in a first device. This method includes the following content by using the first device as an example.

The first device receives a direct communication accept message from the second device. The direct communication accept message includes first algorithm indication information indicating a user plane security algorithm. The first device determines a user plane security protection mode between the first device and the second device based on the user plane security algorithm indicated by the first algorithm indication information, and performs user plane security protection on user plane data between the first device and the second device based on the user plane security protection mode and the user plane security algorithm.

According to the fifth aspect, the first algorithm indication information may indicate both the selected user plane security algorithm and the user plane security protection mode, so that security protection can be performed on the user plane data.

In a possible implementation, before determining the user plane security algorithm, the first device performs control plane negotiation with the second device, to determine a control plane security algorithm and a control plane security protection mode. The control plane security algorithm is determined based on a direct security mode command message received from the second device. The direct security mode command message includes second algorithm indication information indicating the control plane security algorithm.

In a possible implementation, when control plane integrity protection is enabled, the first device performs integrity protection verification on the direct security mode command message, and when the integrity protection verification on the direct security mode command message succeeds, the first device determines the control plane security protection mode between the first device and the second device based on the control plane security algorithm indicated by the second algorithm indication information.

In a possible implementation, the first device sends a direct security command complete message to the second device. The direct security command complete message includes a user plane security policy of the first device, to help the second device to determine the user plane security protection mode based on the user plane security policy of the first device and a user plane security policy of the second device.

In a possible implementation, the direct security command complete message further includes a security capability of the first device, to help the second device to select the control plane security algorithm based on the security capability of the first device and a security capability of the second device. The second device may store the security capability of the first device. In this way, when needing to select the user plane security algorithm, the second device can directly obtain the security capability of the first device, and the first device does not need to send the security capability of the first device again, thereby reducing signaling overheads.

A sixth aspect provides a communication apparatus. The communication apparatus may be a second device or may be an apparatus in a second device. The apparatus may include a module corresponding to performing the method/operation/step/action described in the first aspect or the third aspect. The module may be a hardware circuit, or may be software, or may be implemented by a hardware circuit in combination with software. The apparatus may include a processing module and a transceiver module.

For example, the processing module is configured to select a non-null user plane confidentiality protection algorithm based on a security capability of a first device and a security capability of the second device in a case in which user plane confidentiality protection between the second device and the first device is enabled and control plane confidentiality protection between the second device and the first device is not enabled.

The transceiver module is configured to send a first message to the first device, where the first message includes first algorithm indication information indicating the user plane confidentiality protection algorithm.

A seventh aspect provides a communication apparatus. The apparatus includes a processor, configured to implement the method described in the first aspect or third aspect. The apparatus may further include a memory, configured to store instructions and data. The memory is coupled to the processor. When the processor executes the instructions stored in the memory, the apparatus may be enabled to implement the method provided in the possible implementations of the first aspect, or the method provided in the possible implementations of the third aspect. The apparatus may further include a communication interface. The communication interface is used by the apparatus to communicate with another device. For example, the communication interface may be a circuit hardware module such as a transceiver or a bus and the another device may be a first device or the like. The apparatus may include:
 a memory, configured to store program instructions; and
 a processor, configured to select a non-null user plane confidentiality protection algorithm based on a security capability of a first device and a security capability of a second device in a case in which user plane confidentiality protection between the second device and the first device is enabled and control plane confidentiality protection between the second device and the first device is not enabled, and send a first message to the first device through the communication interface. The first message includes first algorithm indication information indicating the user plane confidentiality protection algorithm.

An eighth aspect provides a computer-readable storage medium, including instructions. When the instructions are run on a computer, the computer is enabled to perform the method provided in the possible implementations of the first aspect, or the possible implementations of the third aspect.

A ninth aspect provides a chip system. The chip system includes a processor, and may further include a memory, configured to implement the method provided in the possible implementations of the first aspect, or the method provided in the possible implementations of the third aspect. The chip system may include a chip or may include a chip and another discrete device.

A tenth aspect provides a communication apparatus. The communication apparatus may be a first device, or may be an apparatus in the first device. The apparatus may include a module corresponding to performing the method/operation/step/action described in the second aspect, the fourth aspect, or the fifth aspect. The module may be a hardware circuit, or may be software, or may be implemented by a hardware circuit in combination with software. The apparatus may include a processing module and a transceiver module.

For example, the transceiver module is configured to send a third message to a second device, where the third message includes a control plane security policy of the first device and a security capability of the first device; receive a fourth message from the second device, where the fourth message includes indication information indicating a null control plane confidentiality protection algorithm; send a second message to the second device, where the second message includes a user plane security policy of the first device; and receive a first message from the second device, where the first message includes first algorithm indication information indicating a non-null user plane confidentiality protection algorithm.

The processing module is configured to confidentiality protect user plane data between the communication apparatus and the second device based on the user plane confidentiality protection algorithm indicated by the first algorithm indication information.

An eleventh aspect provides a communication apparatus. The apparatus includes a processor, configured to implement the method described in the second aspect or third aspect. The apparatus may further include a memory, configured to store instructions and data. The memory is coupled to the processor. When the processor executes the instructions stored in the memory, the apparatus may be enabled to implement the method described in the possible implementations of the second aspect, or the possible implementations of the fourth aspect, or the possible implementations of the fifth aspect. The apparatus may further include a communication interface. The communication interface is used by the apparatus to communicate with another device. For example, the communication interface may be a circuit hardware module such as a transceiver or a bus and the another device may be a second device or the like. The apparatus may include:
 a memory, configured to store program instructions; and
 a processor, configured to send a third message to a second device through the communication interface, where the third message includes a control plane security policy of the first device and a security capability of the first device; receive a fourth message from the second device, where the fourth message includes indication information indicating a null control plane confidentiality protection algorithm; send a second message to the second device, where the second message includes a user plane security policy of the first device; receive a first message from the second device, where the first message includes first algorithm indication information indicating a non-null user plane confidentiality protection algorithm; and confidentiality protect user plane data between the communication apparatus and the second device based on the user plane confidentiality protection algorithm indicated by the first algorithm indication information.

A twelfth aspect provides a computer-readable storage medium, including instructions. When the instructions are run on a computer, the computer is enabled to perform the method provided in the possible implementations of the second aspect, or the possible implementations of the fourth aspect, or the possible implementations of the fifth aspect.

A thirteenth aspect provides a chip system. The chip system includes a processor, and may further include a memory, configured to implement the method provided in the possible implementations of the second aspect, or the possible implementations of the fourth aspect, or the possible implementations of the fifth aspect. The chip system may include a chip or may include a chip and another discrete device.

A fourteenth aspect provides a communication system. The communication system includes a first device and a second device.

The second device is configured to select a non-null user plane confidentiality protection algorithm based on a security capability of a first device and a security capability of the second device in a case in which user plane confidentiality protection between the second device and the first device is enabled and control plane confidentiality protection between the second device and the first device is not enabled; and send a first message to the first device. The first message includes first algorithm indication information indicating the user plane confidentiality protection algorithm.

The first device is configured to receive the first message.

It may be understood that the system provided in the fourteenth aspect includes the first device included in the first aspect and the second device included in the second aspect.

DETAILED DESCRIPTION OF THE EMBODIMENTS

Figure 1:
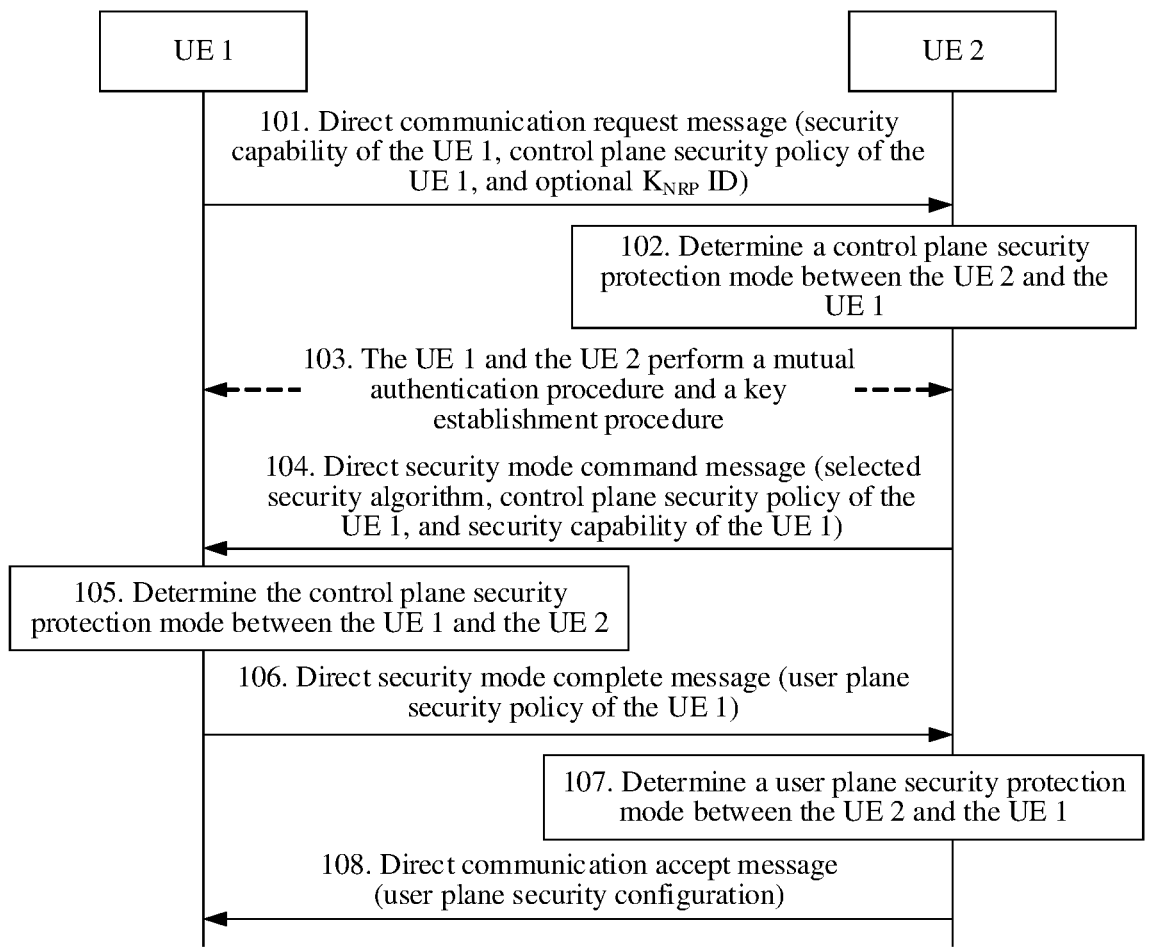
FIG. 1 is a schematic flowchart of a PC5 unicast communication establishment process.

To better understand the embodiments, the following terms are first described.

1. Security Policy

A security policy describes whether security protection is enabled. There are three types of security policies: required, not needed, and preferred. When the security policy is "required", it indicates that security protection needs to be enabled. When the security policy is "not needed", it indicates that security protection does not need to be enabled. When the security policy is "preferred", it indicates that security protection may be enabled or not enabled. Generally, only one of the three types (required, not needed, and preferred) of security policies is selected to be sent. In some special scenarios, at least two types of security policies may be selected to be sent, and one of the two is preferred. For example, when "not needed" and "preferred" are sent, it indicates that security protection is not enabled; when "required" and "preferred" are sent, it indicates that security protection is enabled.

The security policy may include a control plane security policy and a user plane security policy. The control plane security policy indicates whether control plane confidentiality protection and/or control plane integrity protection need/needs to be enabled. The user plane security policy indicates whether user plane confidentiality protection and/or user plane integrity protection need/needs to be enabled. Values of the control plane confidentiality protection policy, the control plane integrity protection policy, the user plane confidentiality protection policy, and/or the user plane integrity protection policy may all include "required", "not needed", and "preferred." For example, if the control plane confidentiality protection policy is "not needed", and the control plane integrity protection policy is "required", it indicates that control plane confidentiality protection does not need to be enabled, and control plane integrity protection needs to be enabled.

Control plane confidentiality protection is to protect confidentiality of signaling during transmission. Control plane confidentiality protection may also be referred to as control plane encryption protection. Confidentiality means that real content cannot be directly read. Control plane integrity protection is to protect integrity of signaling during transmission. Integrity means that the signaling is consistent with original signaling and is not modified. User plane confidentiality protection is to protect confidentiality of user plane data during transmission. User plane confidentiality protection may also be referred to as user plane encryption protection. User plane integrity protection is to protect integrity of user plane data during transmission. Integrity means that the user plane data is consistent with original user plane data and is not modified.

The security policy may be used for determining a security protection mode. For example, in PC5 unicast communication, an initiator notifies a receiving end of a security policy of the initiator, and the receiving end may determine a security protection mode between the initiator and the receiving end based on the security policy of the initiator and a security policy of the receiving end. The security protection mode may include a control plane security protection mode and a user plane security protection mode. The control plane security protection mode refers to whether control plane confidentiality protection is enabled and/or whether control plane integrity protection is enabled. For example, the control plane security protection mode is that control plane confidentiality protection is enabled and control plane integrity protection is enabled. The user plane security protection mode refers to whether user plane confidentiality protection is enabled and/or whether user plane integrity protection is enabled. For example, the user plane security protection mode is that user plane confidentiality protection is enabled and user plane integrity protection is not enabled.

2. Security Algorithm

The security algorithm includes at least one confidentiality protection algorithm and at least one integrity protection algorithm. The confidentiality protection algorithm may also be referred to as an encryption algorithm.

The security algorithm may be further classified into a control plane security algorithm and a user plane security algorithm. The control plane security algorithm is used for protecting signaling, and includes a control plane confidentiality protection algorithm and a control plane integrity protection algorithm. The user plane security algorithm is used for protecting user plane data, and may include a user plane confidentiality protection algorithm and a user plane integrity protection algorithm.

Currently, the user plane security algorithm is the same as the control plane security algorithm. However, in the embodiments, the user plane security algorithm may be the same as or different from the control plane security algorithm.

It should be noted that the security algorithm is a null value may indicate that security protection is not enabled. For example, if the control plane integrity protection algorithm negotiated between the first device and the second device is a null value, it may indicate that control plane integrity protection is not enabled between the first device and the second device.

3. Security Protection and Security Deprotection

Security protection: For a node that implements a security function, both a control plane security algorithm and a control plane security key are used for protecting control plane data (that is, signaling), and both the user plane security algorithm and a user plane security key are used for protecting user plane data. The security protection may include:

(1) User plane confidentiality protection: Encryption protection is performed on user plane data by using a user plane encryption key and a user plane confidentiality protection algorithm.

(2) User plane integrity protection: Integrity protection is performed on user plane data by using a user plane integrity protection key and a user plane integrity protection algorithm.

(3) Control plane confidentiality protection: Encryption protection is performed on control plane data by using a control plane encryption key and a control plane confidentiality protection algorithm.

(4) Control plane integrity protection: Integrity protection is performed on control plane data by using a control plane integrity protection key and a control plane integrity protection algorithm.

A sequence relationship between encryption protection and integrity protection is not limited in the embodiments. User plane/control plane data may be first encryption protected, and then the user plane/control plane data may be integrity protected; or user plane/control plane may be first integrity protected, and then the user plane/control plane data may be encryption protected. An execution sequence used on the user plane may not be the same as an execution sequence used on the control plane.

Security deprotection: For a node that implements a security function, both a control plane security algorithm and a control plane security key are used for obtaining original control plane data, and both a user plane security algorithm and a user plane security key are used for obtaining original user plane data. The security deprotection may include:

(1) User plane decryption: Encrypted user plane data is decrypted by using a user plane encryption key and a user plane confidentiality protection algorithm.

(2) User plane integrity verification: Integrity protection verification is performed on user plane data by using a user plane integrity protection key and a user plane integrity protection algorithm.

(3) Control plane decryption: Encrypted control plane data is decrypted by using a control plane encryption key and a control plane confidentiality protection algorithm.

(4) Control plane integrity verification: Integrity protection verification is performed on control plane data by using a control plane integrity protection key and a control plane integrity protection algorithm.

A sequence of decryption and integrity protection verification is not limited in the embodiments. However, it should be understood that, if user plane/control plane data is first encryption protected, and then the user plane/control plane data is integrity protected, a sequence of security deprotection is to first perform integrity protection verification on the user plane/control plane data and then decrypt the encrypted user plane data. If user plane/control plane data is first integrity protected, and then the user plane/control plane data is encryption protected, a sequence of security deprotection is to first decrypt encrypted data and then perform integrity protection verification. Security deprotection corresponds to enablement of security protection. That is, security deprotection is required only when security protection is enabled.

4. Security Protection in PC5 Unicast Communication

In PC5 unicast communication, an initiator negotiates with a receiving end to determine whether PC5 security is enabled, that is, determine a security protection mode between the two ends. The initiator and the receiving end may perform negotiation by using a control plane message (or referred to as a signaling message), for example, perform negotiation by using a control plane message in a process of establishing PC5 unicast communication, as shown in FIG. 1. In FIG. 1, the initiator is a user equipment (UE) 1, and the receiving end is UE 2. Details are as follows:

Step 101: The UE 1 sends a direct communication request (DCR) message to the UE 2. Correspondingly, the UE 2 receives the direct communication request message from the UE 1.

The direct communication request message may include a security capability (UE 1 security capabilities) of the UE 1 and a control plane security policy (UE 1 signaling security policy) of the UE 1, and optionally include a random number 1 (nonce_1) generated by the UE 1. The security capability of the UE 1 may include a security algorithm (which is applicable to a user plane and/or a control plane) supported by the UE 1. The security algorithm supported by the UE 1 may be a security algorithm supported by the UE 1 in this PC5 unicast connection or may be a security algorithm supported by the UE 1. The security algorithm includes an integrity protection algorithm and a confidentiality protection algorithm. A definition of the security capability of the UE 2 is similar, and details are not described again subsequently. The control plane security policy of the UE 1 is a control plane security policy that the UE 1 expects to use in this PC5 unicast connection, and includes a control plane integrity protection policy and a control plane confidentiality protection policy. For example, if the UE 1 expects to enable control plane confidentiality protection in this PC5 unicast connection, the control plane integrity protection policy is "required."

The direct communication request message may further include information (Key_Est_Info) required for key establishment. The information required for key establishment may be an information container carrying information required for key establishment. The UE 1 and the UE 2 may establish a shared key between the UE 1 and the UE 2 by exchanging the key establishment information.

Optionally, the direct communication request message may further include a root key identifier ($K_{NRP}$ ID), $K_{NRP}$ ID identifies a root key $K_{NRP}$, and $K_{NRP}$ may be a shared key established by the UE 1 and the UE 2 in a mutual authentication procedure and a key establishment procedure before step 101 is performed. If the UE 1 can perceive the identity of the UE 2, and the UE 1 stores partial context information between the UE 1 and the UE 2, the direct communication request message includes $K_{NRP}$ ID. That the UE 1 can perceive the identity of the UE 2 means that the UE 1 can determine which user the UE 2 is. That the UE 1 stores partial context information between the UE 1 and the UE 2 means that the UE 1 has communicated with the UE 2 before, and the UE 1 stores partial context information between the UE 1 and the UE 2, where the partial context information includes $K_{NRP}$ and $K_{NRP}$ ID between the UE 1 and the UE 2.

Optionally, step 101 may alternatively be that the UE 1 sends a direct rekeying request message to the UE 2. Correspondingly, the UE 2 receives the direct rekeying request from the UE 1. In this case, the message does not include the control plane security policy of UE 1.

Step 102: The UE 2 determines a control plane security protection mode between the UE 2 and the UE 1, that is, the UE 2 determines, for signaling between the UE 2 and the UE 1, whether to enable control plane integrity protection and whether to enable control plane confidentiality protection, and selects a security algorithm.

The UE 2 determines a control plane security protection mode between the UE 2 and the UE 1 based on a control plane security policy of the UE 1 and a control plane security policy of the UE 2. The control plane security protection mode between the UE 2 and the UE 1 may also be described as a control plane security protection mode used for the PC5 unicast connection.

For example, the UE 2 may determine, based on the following method, whether to enable control plane integrity protection:

(1) If the control plane integrity protection policy of the UE 1 is "required", and the control plane integrity protection policy of the UE 2 is "preferred" or "required", the UE 2 determines to enable control plane integrity protection between the UE 2 and the UE 1.

(2) If the control plane integrity protection policy of the UE 1 is "required" or "preferred", and the control plane integrity protection policy of the UE 2 is "required", the UE 2 determines to enable control plane integrity protection between the UE 2 and the UE 1.

(3) If the control plane integrity protection policy of the UE 1 is "preferred", and the control plane integrity protection policy of the UE 2 is "preferred", the UE 2 determines, based on the policy of the UE 2, whether to enable control plane integrity protection between the UE 2 and the UE 1. For example, a default policy may be that control plane integrity protection between the UE 2 and the UE 1 may be enabled, or determines, based on a performance condition of the UE 2, whether to enable control plane integrity protection between the UE 2 and the UE 1. The setting of a policy is not limited.

(4) When either of the control plane integrity protection policy of the UE 1 and the control plane integrity protection policy of the UE 2 is "not needed", and the other is not "required", the UE 2 determines that control plane integrity protection between the UE 2 and the UE 1 is not enabled.

(5) When either of the control plane integrity protection policy of the UE 1 and the control plane integrity protection policy of the UE 2 is "not needed", and the other is "required", a security connection cannot be established between the UE 2 and the UE 1.

The method in which the UE 2 determines whether to enable control plane confidentiality protection is similar to the foregoing method for determining whether to enable control plane integrity protection, and details are not described again. Further, in a possible implementation, if the UE 2 determines that control plane integrity protection between the UE 2 and the UE 1 is not enabled, the UE 2 determines that control plane confidentiality protection between the UE 2 and the UE 1 is also not enabled. If the UE 2 determines to enable control plane integrity protection between the UE 2 and the UE 1, the method in which the UE 2 determines whether to enable control plane confidentiality protection between the UE 2 and the UE 1 is similar to the foregoing method for determining whether to enable control plane integrity protection.

Further, the UE 2 determines a security algorithm based on the control plane security protection mode determined between the UE 2 and the UE 1.

The UE 2 may determine, based on a security capability of the UE 2 and a security capability of the UE 1, a confidentiality protection algorithm supported by both the UE 1 and the UE 2 as the control plane confidentiality protection algorithm between the UE 1 and the UE 2, and determine an integrity protection algorithm supported by both the UE 1 and the UE 2 as a control plane integrity protection algorithm between the UE 1 and the UE 2. For example, if the UE 2 determines that control plane confidentiality protection between the UE 2 and the UE 1 needs to be enabled, the UE 2 selects, based on a security capability of the UE 2 and a security capability of the UE 1, a non-null confidentiality protection algorithm supported by both the UE 1 and the UE 2, as a confidentiality protection algorithm for performing control plane confidentiality protection between the UE 1 and the UE 2. If the UE 2 determines that the control plane confidentiality protection between the UE 2 and the UE 1 needs to be not enabled, the UE 2 determines a null (null) algorithm as a control plane confidentiality protection algorithm between the UE 1 and the UE 2. In another example, if the UE 2 determines that control plane integrity protection between the UE 2 and the UE 1 needs to be enabled, the UE 2 selects a non-null (non-null) integrity protection algorithm. If the UE 2 determines that control plane integrity protection between the UE 2 and the UE 1 needs to be not enabled, the UE 2 determines a null algorithm as a control plane integrity protection algorithm between the UE 1 and the UE 2.

Optionally, in step 103, the UE 1 and the UE 2 perform a mutual authentication procedure and a key establishment procedure.

In the conventional technology, if the UE 2 determines to enable control plane integrity protection, and there is no existing shared key between the UE 1 and the UE 2, a mutual authentication procedure and a key establishment procedure between the UE 2 and the UE 1 need to be triggered. If the UE 2 determines not to enable control plane integrity protection, step 103 does not need to be performed. If the direct communication request message includes $K_{NRP}$ ID, the UE 2 determines the shared key $K_{NRP}$ between the UE 2 and the UE 1 based on $K_{NRP}$ ID, and therefore, step 103 may not be performed.

Step 104: The UE 2 sends a direct security mode command (direct security mode command) message to the UE 1. Correspondingly, the UE 1 receives the direct security mode command message from the UE 2. If the UE 2 determines, in step 102, to enable control plane integrity protection, the UE 2 performs integrity protection on the direct security mode command message.

The direct security mode command message includes a security algorithm (chosen_algs) selected by the UE 2. The selected security algorithm may include the security algorithm selected by the UE 2 in step 102. The security algorithm may be one of the following:

(1) When the UE 2 determines not to enable control plane integrity protection, control plane confidentiality protection is also not enabled by default. In this case, the security algorithm includes a null integrity protection algorithm and a null confidentiality protection algorithm, and may indicate to not enable control plane integrity protection between the UE 2 and the UE 1 and not enable control plane confidentiality protection between the UE 2 and the UE 1.

(2) When the UE 2 determines to enable control plane integrity protection and enable control plane confidentiality protection, the security algorithm includes a non-null integrity protection algorithm and a non-null confidentiality protection algorithm, and may indicate to enable control plane integrity protection between the UE 2 and the UE 1 and enable control plane confidentiality protection between the UE 2 and the UE 1.

(3) When the UE 2 determines to enable control plane integrity protection and not enable control plane confidentiality protection, the security algorithm includes a non-null integrity protection algorithm and a null confidentiality protection algorithm, and may indicate to enable control plane integrity protection between the UE 2 and the UE 1 and not enable control plane confidentiality protection between the UE 2 and the UE 1.

The direct security mode command message further includes a security capability of the UE 1 and a control plane security policy of the UE 1. The security capability of the UE 1 and the control plane security policy of the UE 1 are the security capability of the UE 1 and the control plane security policy of the UE 1 that are received by the UE 2 from the message in step 101, to prevent a bidding down attack (bidding down attack). When the UE 2 determines to enable control plane integrity protection, the direct security mode command message further includes a random number 2 (nonce_2) generated by the UE 2. Because the UE 2 enables control plane integrity protection, the UE 2 may perform integrity protection on the direct security mode command message. For example, the UE 2 may calculate a session key $K_{NRP\text{-}sess}$ by using the root key $K_{NRP}$, the random number 1, and the random number 2, further derive and generate an integrity protection key (NRPIK) based on the session key $K_{NRP\text{-}sess}$, and perform integrity protection on the direct security mode command message by using the integrity protection key.

Optionally, regardless of whether control plane confidentiality protection is enabled, the direct security mode command message is not encrypted.

Step 105: The UE 1 determines a control plane security protection mode between the UE 1 and the UE 2, that is, the UE 1 determines, for signaling between the UE 1 and the UE 2, whether to enable control plane integrity protection and whether to enable control plane confidentiality protection.

The UE 1 determines the control plane security protection mode between the UE 1 and the UE 2 based on the selected security algorithm included in the direct security mode command message. The selected security algorithm included in the direct security mode command message may not only indicate a security algorithm used between the UE 1 and the UE 2 but may also implicitly indicate whether to enable corresponding control plane security protection. For example, if the confidentiality protection algorithm is a non-null value, the UE 1 determines to enable control plane confidentiality protection, and confidentiality protects a subsequent control plane message by using the confidentiality protection algorithm carried in the direct security mode command message. If the integrity protection algorithm is a non-null, the UE 1 determines to enable control plane integrity protection, and performs integrity protection on a subsequent control plane message by using the control plane integrity protection algorithm carried in the direct security mode command message.

When control plane integrity protection is enabled, the UE 1 calculates the session key $K_{NRP\text{-}sess}$ by using $K_{NRP}$, the random number 1, and the random number 2, and further calculates, by using $K_{NRP\_sess}$, an integrity protection key (NRPIK) used in the PC5 unicast connection. If control plane confidentiality protection is also enabled, the UE 1 further calculates the encryption key (NRPEK) used in the PC5 unicast connection by using $K_{NRP\text{-}sess}$.

When control plane integrity protection is enabled, the UE 1 performs the following three verification processes:

A. The UE 1 verifies whether the security capability of the UE 1 in the direct security mode command message is the same as the security capability sent to the UE 2.

B. The UE 1 verifies whether the security policy of the UE 1 in the direct security mode command message is the same as the security policy sent to the UE 2.

C. If integrity protection is enabled, integrity protection verification is performed on the direct security mode command message. If integrity protection is not enabled, integrity verification is not required.

When all the foregoing three verifications succeed, the UE 1 activates control plane security protection between the UE 1 and the UE 2, and includes the user plane security policy of the UE 1 in a direct security mode complete message. If any one of the foregoing three verifications fails, the UE 1 releases the connection between the UE 1 and the UE 2, and sends a connection establishment rejection message to the UE 2. The connection establishment rejection message also carries a rejection cause value. It should be noted that a sequence of performing the foregoing three verifications is not limited.

When control plane integrity protection is not enabled, the UE 1 performs the foregoing verification processes A and B. If both the verification processes succeed, the UE 1 include the user plane security policy of the UE 1 in the direct security mode complete message.

Step 106: The UE 1 sends a direct security mode complete (direct security mode complete) message to the UE 2. Correspondingly, the UE 2 receives the direct security mode complete message from the UE 1.

The direct security mode complete message carries the user plane security policy of the UE 1, and is used for negotiating with the UE 2 to determine the user plane security protection mode.

Optionally, when control plane integrity protection between the UE 1 and the UE 2 is enabled, the UE 1 performs integrity protection on the direct security mode complete message. If control plane confidentiality protection is further enabled between the UE 1 and the UE 2, the UE 1 confidentiality protects the direct security mode complete message.

Step 107: The UE 2 determines a user plane security protection mode between the UE 2 and the UE 1, that is, the UE 2 determines, for user plane data between the UE 2 and the UE 1, whether to enable user plane integrity protection and whether to enable user plane confidentiality protection.

When receiving the direct security mode complete message, the UE 2 may determine the user plane security protection mode between the UE 2 and the UE 1 based on the user plane security policy of the UE 1 and the user plane security policy of the UE 2. A process in which the UE 2 determines the user plane security protection mode is similar to the process in which the UE 2 determines the control plane security protection mode. Details are not described herein again.

Step 108: The UE 2 sends a direct communication accept message to the UE 1. Correspondingly, the UE 1 receives the direct communication accept message from the UE 2.

The direct communication accept message may include a user plane security configuration indicating whether user plane integrity protection is enabled and whether user plane confidentiality protection is enabled. The user plane security configuration may be understood as indication information indicating whether user plane integrity protection is enabled and whether user plane confidentiality protection is enabled.

When receiving the direct communication accept message, the UE 1 enables corresponding security protection based on the user plane security configuration.

When both control plane integrity protection and user plane integrity protection are enabled, a same non-null integrity protection algorithm is used on the control plane and the user plane. When both control plane confidentiality protection and user plane confidentiality protection are enabled, a same non-null confidentiality protection algorithm is used on the control plane and the user plane.

When control plane integrity protection is not enabled, control plane confidentiality protection is not enabled by default, and neither user plane integrity protection nor user plane confidentiality protection is enabled. That is, the integrity protection algorithm is a null value, and the confidentiality protection algorithm is a null value. However, when control plane integrity protection is enabled, control plane confidentiality protection may be enabled or not enabled, user plane integrity protection may be enabled or not enabled, and user plane encryption may be enabled or not enabled. The latter three are enabled or not enabled independently of each other. A security algorithm used for the PC5 unicast connection is negotiated when a control plane security enabling manner is negotiated, and a user plane security enabling manner is negotiated after the control plane security enabling manner is negotiated. Therefore, when a control plane security protection negotiation result is that control plane confidentiality protection is not enabled, if a null algorithm is correspondingly selected as a confidentiality protection algorithm for the PC5 unicast connection, UEs at both ends may fail to confidentiality protect, after a user plane security protection negotiation result subsequently becomes that confidentiality protection is enabled, user plane data by using an effective confidentiality protection algorithm.

Figure 2:
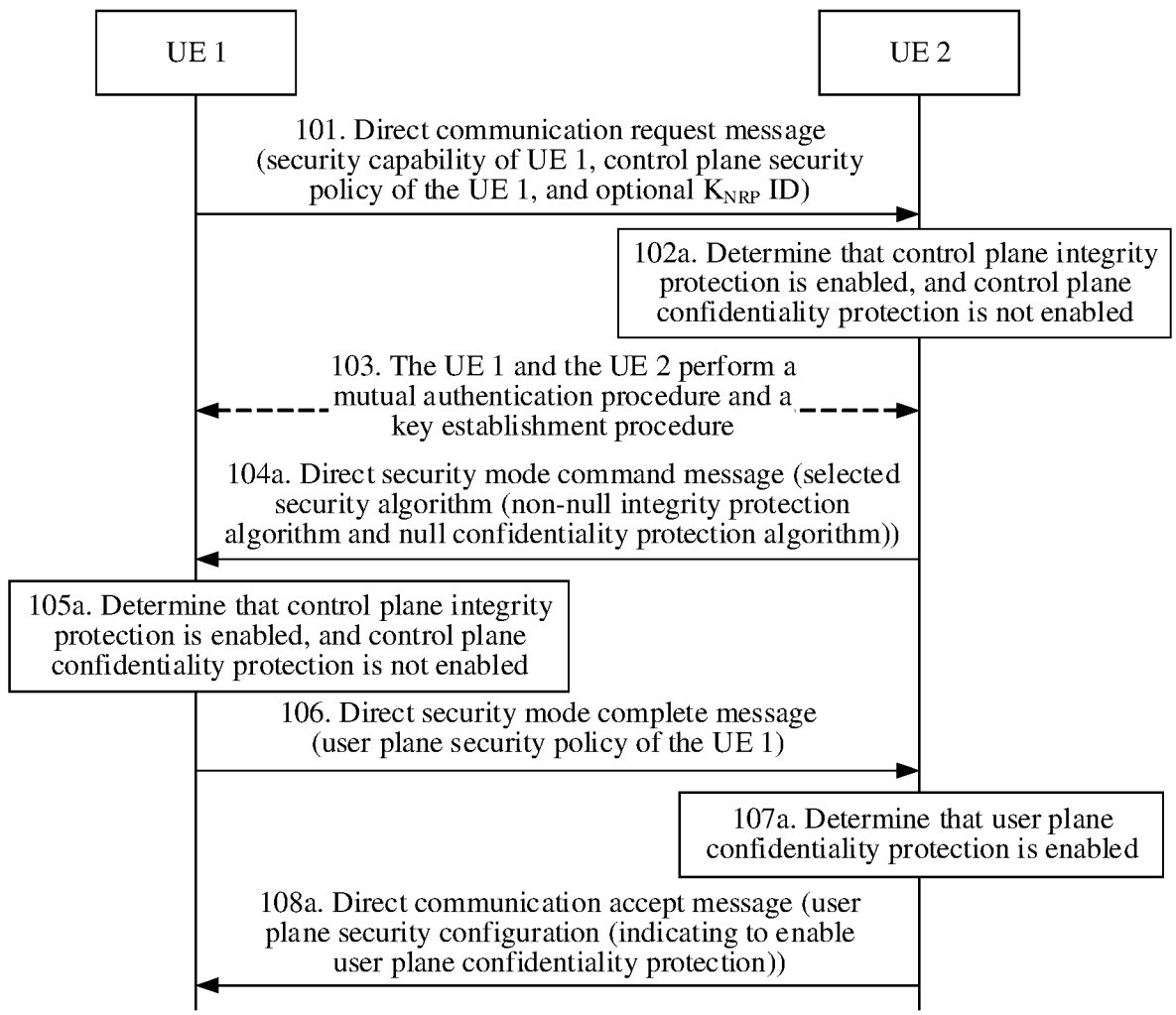
FIG. 2 is an example diagram of security protection in PC5 unicast communication.

For example, refer to FIG. 2. For a part in FIG. 2 that is the same as that in FIG. 1, refer to the description of FIG. 1. In FIG. 2, if the UE 2 determines, in step 102a, that control plane integrity protection is enabled and control plane confidentiality protection is not enabled, the security algorithm carried in the direct security mode command message in step 104a includes a non-null integrity protection algorithm and a null confidentiality protection algorithm, to indicate the UE 1 to enable control plane integrity protection and not enable control plane confidentiality protection. However, the UE 2 determines, in step 107a, that user plane confidentiality protection is enabled, and the user plane security configuration in the direct communication accept message indicates to enable user plane confidentiality protection. However, the UE 1 obtains a null confidentiality protection algorithm from the security algorithm in step 104a, and the null confidentiality protection algorithm cannot effectively confidentiality protect the user plane data.

Optionally, step 108 may also be that the UE 2 sends a direct rekeying response message to the UE 1. Correspondingly, the UE 1 receives the direct rekeying response from the UE 2.

Optionally, step 108 may also be that the UE 2 sends an RRC connection reconfiguration message to the UE 1. Correspondingly, the UE 1 receives the RRC connection reconfiguration message from the UE 2.

5. Security Protection in Uu Communication

A security protection mode of a Uu interface for communication between a base station and a terminal device is first enabling radio resource control (RRC) layer security protection and then enabling user plane security protection. RRC layer security protection may be understood as control plane security protection. The RRC layer security protection mode is that integrity protection is required and confidentiality protection is preferred. The base station may include a security algorithm in an access stratum (AS) security mode command (SMC) message sent to the terminal device. The security algorithm includes an integrity protection algorithm and a confidentiality protection algorithm. When determining the user plane security protection mode, the base station indicates, by using security enabling indication information carried in an RRC connection reconfiguration message, the terminal device whether to enable user plane integrity protection and whether to enable user plane confidentiality protection. If user plane integrity protection is enabled, the terminal device may perform integrity protection on the user plane data by using the integrity protection algorithm carried in an AS SMC message. If user plane confidentiality protection is enabled, the terminal device confidentiality may protect the user plane data by using the confidentiality protection algorithm carried in the AS SMC message.

In Uu communication, it is possible that user plane confidentiality protection is enabled, but user plane data cannot be confidentiality protected by using an effective confidentiality protection algorithm.

For security protection in PC5 communication and security protection in Uu communication, refer to Table 1.

TABLE 1

|  | PC5 communication | Uu communication |
| --- | --- | --- |
| Control plane security protection mode | Indicated by a selected security algorithm, where a null algorithm indicates "not needed", and a non-null algorithm indicates "required" | Control plane integrity protection is required, and control plane confidentiality protection is preferred (or a control plane security protection mode is preconfigured). |
| Control plane security algorithm | Determined based on an identifier of an integrity protection algorithm and an identifier of a confidentiality protection algorithm in a selected security algorithm | Determined based on an identifier of an integrity protection algorithm and an identifier of a confidentiality protection algorithm in a security algorithm |
| Message that triggers activation of control plane security protection | Direct security mode command message | Access stratum security mode command message |
| User plane security protection mode | Indicated by a user plane security configuration | Indicated by security enabling indication information |
| User plane security algorithm | Comply with a security | Comply with an access stratum |

TABLE 1-continued

| | PC5 communication | Uu communication |
|---|---|---|
| Message that triggers activation of user plane security protection | algorithm negotiated on a control plane. Direct communication accept message | security algorithm negotiated on a control plane RRC connection reconfiguration message |

It can be understood from Table 1 that the following problem exists in security protection of PC5 communication and Uu communication: If control plane integrity protection is enabled, and control plane confidentiality protection is not enabled, when user plane confidentiality protection needs to be enabled, user plane data cannot be confidentiality protected by using an effective confidentiality protection algorithm.

In view of this, the embodiments may provide a method for determining a user plane security algorithm, a system, and an apparatus, to determine an effective user plane security algorithm, for performing security protection on user plane data. Further, an effective user plane confidentiality protection algorithm can be determined, for confidentiality protecting user plane data.

In the accompanying drawings in the embodiments, the steps shown in embodiments and a sequence between the steps are used as examples, and do not constitute a limitation on the embodiments. It should be understood that performing some steps in the figure or adjusting a sequence of the steps for implementation falls within the scope of the embodiments.

Technologies described in embodiments may be used in various communication systems, for example, a fourth generation (4G) communication system, a 4.5G communication system, a 5G communication system, a system with various communication systems integrated, or a future evolved communication system.

The device included in the embodiments may be a terminal device (also referred to as a terminal). The terminal device may be a device having wireless receiving and sending functions, and may be deployed on the land, including an indoor or outdoor device, a handheld device, or an in-vehicle device. The terminal device may also be deployed on the water (for example, on a ship). The terminal device may also be deployed in the air (for example, on aircraft, on a balloon, and on a satellite). The terminal device may be a UE. The UE includes a handheld device, an in-vehicle device, a wearable device, or a computing device that has a wireless communication function. For example, the UE may be a mobile phone, a tablet computer, or a computer having wireless receiving and sending functions. The terminal device may also be a virtual reality (VR) terminal device, an augmented reality (AR) terminal device, a smart vehicle terminal device, a wireless terminal in industrial control, a wireless terminal in unmanned driving, an unmanned aerial vehicle, an unmanned aerial vehicle controller, a wireless terminal in telemedicine, a wireless terminal in a smart grid, a wireless terminal in a smart city, a wireless terminal in a smart home, or the like. In embodiments, an apparatus configured to implement a function of the terminal device may be a terminal device or may be an apparatus capable of supporting the terminal device to implement the function, for example, a chip system. The apparatus may be installed in the terminal device or used together with the terminal device, for example, a processor.

The device included in the embodiments may also be an access network device, may include a base station (BS), and may be a device deployed in a radio access network and capable of performing wireless communication with a terminal device. The base station may be in a plurality of forms, such as a macro base station, a micro base station, a relay station, and an access point. For example, the access network device in the embodiments may be a base station in 5G or a base station in Long Term Evolution (LTE). The base station in 5G may also be referred to as a transmission reception point (TRP) or a next generation NodeB (gNB). In the embodiments, an apparatus configured to implement a function of the access network device may be an access network device or may be an apparatus capable of supporting the access network device to implement the function, for example, a chip system. The apparatus may be installed in the access network device or used together with the access network device, for example, a processor. In this embodiment, the chip system may include a chip, or may include a chip and another discrete component.

The device included in the embodiments may also be a core network device, and may include an access and mobility management network element (AMF) for mobility management and access management, a session management network element (SMF) for session management, and a user plane network element (UPF) for forwarding and receiving of user data in the terminal device.

In the embodiments, the apparatus configured to implement the function may be a terminal device. The terminal device may be a terminal device in a D2D communication system, a terminal device in a V2X communication system, an in-vehicle terminal or the like in a vehicle to vehicle (V2V) communication system, an unmanned aerial vehicle, an unmanned aerial vehicle controller or the like in an unmanned aerial system (UAS), or may be a terminal device in another short-range direct communication system.

Figure 3:
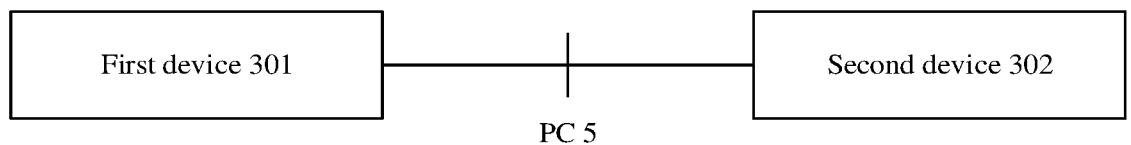
FIG. 3 is a schematic diagram of a network architecture to which an embodiment is applied.

FIG. 3 is a schematic diagram of a network architecture to which an embodiment is applied. FIG. 3 includes a first device 301 and a second device 302.

The device may be a terminal device, an access network device, or a core network device. The access network device may be, for example, a base station in various communication systems. The core network device may be, for example, a user plane function (UPF), an access and mobility management function (AMF), or a multi-access edge computing (MEC) device. The first device 301 and the second device 302 may be devices of a same type, for example, both are UEs, or may be devices of different types. For example, the first device 301 is a terminal device, and the second device 302 is an access network device or an AMF network element.

The first device 301 and the second device 302 may negotiate a user plane security algorithm in the following three manners. The three manners use an example in which the first device 301 initiates a PC5 unicast connection to the second device 302.

Manner 1: The first device 301 negotiates with the second device 302 on a control plane, and the second device 302 determines a control plane security protection mode, a control plane security algorithm, and second algorithm indication information. The second algorithm indication information includes a control plane security algorithm, and the second algorithm indication information may indicate both the control plane security protection mode and a control plane security algorithm. It should be noted that the algorithm indicated by the second algorithm indication information may also be used as a user plane security protection algorithm. The first device 301 negotiates with the second device 302 on the control plane. After the control plane security protection mode and the control plane security algorithm are determined through the negotiation, the second device 302 determines the user plane security protection mode, and generates user plane security enabling indication information.

The second device 302 determines that a security algorithm indicated in the second algorithm indication information does not support the user plane security protection mode. For example, during the negotiation on the control plane, the second device 302 determines that confidentiality protection is not enabled, and the second algorithm indication information includes a null confidentiality protection algorithm. During negotiation on a user plane, the second device 302 determines that user plane confidentiality protection is enabled. In this case, the null confidentiality protection algorithm in the second algorithm indication information does not support enabling of user plane confidentiality protection. Alternatively, if the second device 302 determines that the user plane security protection mode is inconsistent with the control plane security protection mode, for example, control plane integrity protection is enabled, control plane confidentiality protection is not enabled, and user plane confidentiality protection is enabled, the second device 302 selects a user plane security algorithm based on the user plane security protection mode and a security capability of the first device 301 and a security capability of the second device 302, and indicates the user plane security algorithm by using first algorithm indication information. For example, the second device 302 determines that control plane integrity protection is enabled, control plane confidentiality protection is not enabled, and user plane confidentiality protection is enabled. The first algorithm indication information includes a non-null confidentiality protection algorithm identifier, indicating a user plane confidentiality protection algorithm.

In Manner 1, the second algorithm indication information may indicate both the control plane security protection mode and the control plane security algorithm, the user plane security enabling indication information indicates the user plane security protection mode, and the first algorithm indication information indicates the user plane security algorithm. In this solution, because the first algorithm indication information indicating user plane security protection is additionally sent, it is ensured that devices at both ends can obtain a security protection algorithm supporting enabling of user plane security protection. In Manner 1, optionally, regardless of whether the user plane security protection mode is inconsistent with the control plane security protection mode or whether the control plane security algorithm supports the user plane security protection mode, the second device 302 selects the user plane security algorithm based on the user plane security protection mode and the security capability of the first device 301 and the security capability of the second device 302, and indicates the user plane security algorithm by using the first algorithm indication information, to simplify processing logic of the device, thereby improving the processing efficiency.

Manner 2: The first device 301 negotiates with the second device 302 on a control plane, and the second device 302 determines a control plane security protection mode, a control plane security algorithm, and second algorithm indication information. The second algorithm indication information includes a control plane security algorithm, and the second algorithm indication information may indicate both the control plane security protection mode and the control plane security algorithm. It should be noted that the algorithm indicated by the second algorithm indication information may also be used as a user plane security protection algorithm. The first device 301 negotiates with the second device 302 on the control plane. After the control plane security protection mode and the control plane security algorithm are determined through the negotiation, the second device 302 determines the user plane security protection mode.

The second device 302 determines that a security algorithm indicated in the second algorithm indication information does not support the user plane security protection mode. For example, a control plane confidentiality protection algorithm is a null value, user plane confidentiality protection is enabled, and a null confidentiality protection algorithm does not support enabling of user plane confidentiality protection. Alternatively, the second device 302 determines that the user plane security protection mode is inconsistent with the control plane security protection mode, for example, control plane integrity protection is enabled, control plane confidentiality protection is not enabled, and user plane confidentiality protection is enabled, the second device 302 selects a user plane security algorithm based on the user plane security protection mode and a security capability of the first device 301 and a security capability of the second device 302, and indicates the user plane security algorithm by using first algorithm indication information. The first algorithm indication information may further indicate the user plane security protection mode. For example, the second device 302 determines that control plane integrity protection is enabled, confidentiality protection is not enabled, and user plane confidentiality protection is enabled. The first algorithm indication information includes a null integrity protection algorithm identifier and a non-null confidentiality protection algorithm identifier, and indicates a user plane integrity protection algorithm and that user plane integrity protection is not enabled, and indicate a user plane confidentiality protection algorithm and that user plane confidentiality protection is enabled.

In Manner 2, the second algorithm indication information may indicate both a control plane security protection mode and a control plane security algorithm. The first algorithm indication information may indicate both a user plane security protection mode and a user plane security algorithm. In this solution, because the first algorithm indication information indicating user plane security protection is additionally sent, it is ensured that devices at both ends can obtain a security protection algorithm supporting enabling of user plane security protection. In addition, a user plane security enabling manner is indicated by using the first algorithm indication information, thereby reducing a message length.

In Manner 2, optionally, regardless of whether the user plane security protection mode is inconsistent with the control plane security protection mode or whether the control plane security algorithm supports the user plane security protection mode, the second device 302 selects the user plane security algorithm based on the user plane security protection mode, the security capability of the first device 301, and the security capability of the second device 302, and indicates the user plane security algorithm and the user plane security enabling manner by using the first algorithm indication information, to simplify processing logic of the device, thereby improving the processing efficiency.

Manner 3: The first device 301 negotiates with the second device 302 on a control plane, and the second device 302 determines a control plane security protection mode, and selects a security algorithm based on that security protection is enabled, a security capability of the first device 301, and a security capability of the second device 302. The selected security algorithm is indicated by using third algorithm indication information. The third algorithm indication information indicates a non-null integrity protection algorithm and a non-null confidentiality protection algorithm. The control plane security protection mode is indicated by using control plane security enabling indication information. The first device 301 determines a control plane security protection algorithm based on the control plane security protection mode and the third algorithm indication information. A user plane security protection mode is indicated by using user plane security enabling indication information. The first device 301 determines a user plane security protection algorithm based on the user plane security protection mode and the third algorithm indication information. If security protection is enabled, security protection may be performed by using a non-null security protection algorithm indicated in the third algorithm indication information. If security protection is not enabled, a null security protection algorithm is used by default, or no algorithm is executed to save computing resources.

In Manner 3, the control plane security enabling indication information indicates the control plane security protection mode, the user plane security enabling indication information indicates the user plane security protection mode, and the third algorithm indication information indicates the non-null integrity protection algorithm and the non-null confidentiality protection algorithm. The non-null integrity protection algorithm indicated in the third algorithm indication information is used when integrity protection is enabled, and the non-null confidentiality protection algorithm in the third algorithm indication information is used when confidentiality protection is enabled. If security protection is not enabled, a null security protection algorithm is used by default, or no algorithm is executed to save computing resources. In this solution, the non-null confidentiality protection algorithm and the non-null integrity protection algorithm are indicated in the third algorithm indication information, so that it is ensured that devices at both ends can obtain a security protection algorithm supporting enabling of user plane security protection. In addition, in user plane security negotiation, only security enabling indication information indicates a user plane security enabling manner, thereby reducing a message length.

By using any one of the foregoing three manners, even if control plane integrity protection is enabled, confidentiality protection is not enabled, and user plane confidentiality protection is enabled, an effective confidentiality protection algorithm can be determined, for confidentiality protecting user plane data.

The following describes in detail a method for determining a user plane security algorithm provided in this embodiment. An example of a first device is UE 1, and an example of a second device is UE 2. It should be noted that names of messages between network elements, names of parameters in the messages, or the like in the following embodiments are merely examples, and there may be other names during implementation. This is not limited in the embodiments.

Figure 4:
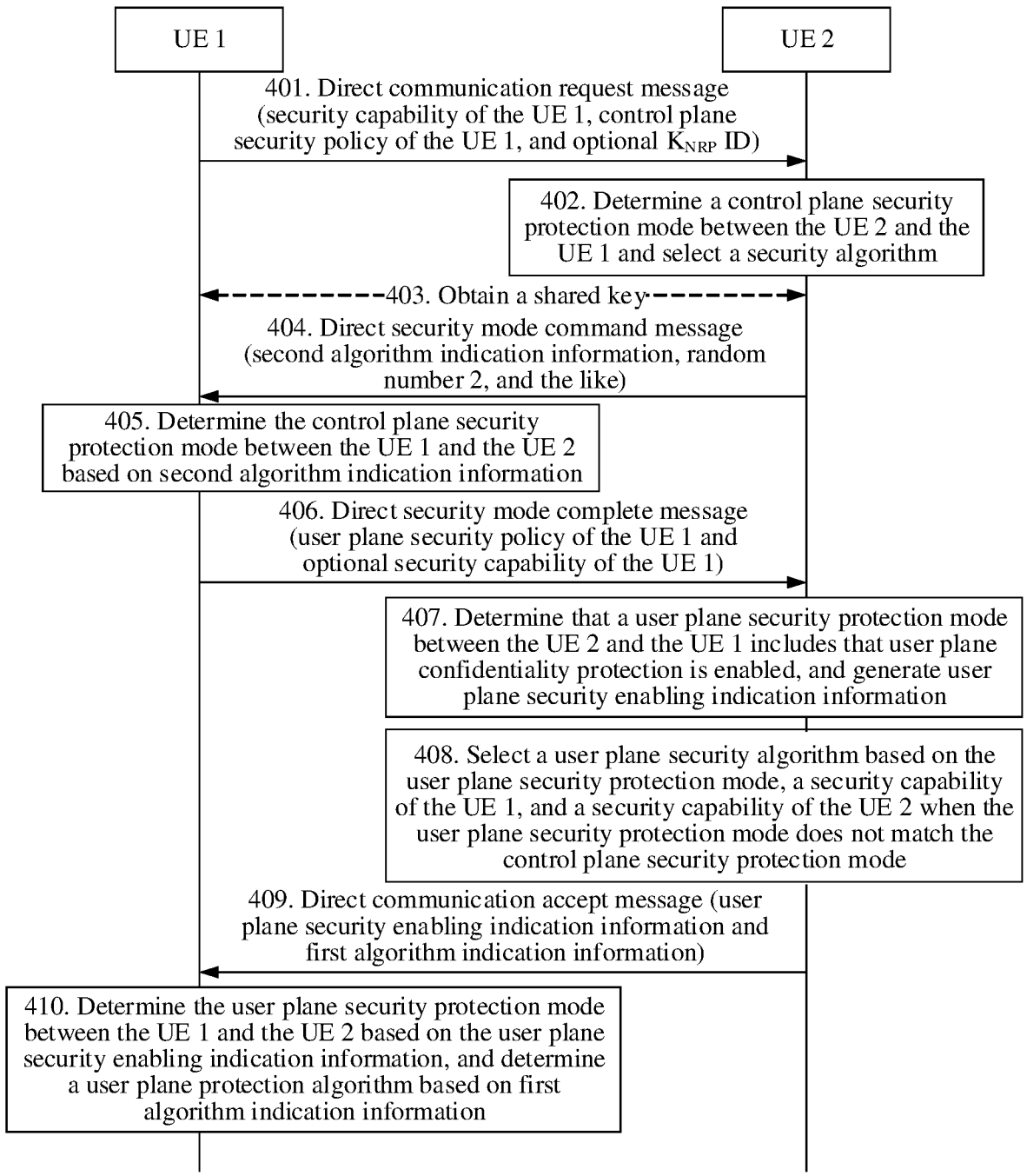
FIG. 4 is a schematic flowchart of a method for determining a user plane security algorithm according to Embodiment 1.

FIG. 4 is a schematic flowchart of a method for determining a user plane security algorithm according to Embodiment 1. The procedure may include, but is not limited to, the following steps.

Step 401: UE 1 sends a direct communication request message to UE 2. Correspondingly, the UE 2 receives the direct communication request message from the UE 1.

Optionally, step 401 may alternatively be that the UE 1 sends a direct rekeying request message to the UE 2. Correspondingly, the UE 2 receives the direct rekeying request from the UE 1. In this case, the message does not include the control plane security policy of UE 1.

When deciding to establish PC5 unicast communication with the UE 2, the UE 1 sends a direct communication request message to the UE 2.

The direct communication request message may include a control plane security policy of the UE 1, and is used for negotiation with the UE 2, to determine whether to enable control plane integrity protection and whether to enable control plane confidentiality protection. A security policy of the UE 1 may be configured by a core network device for the UE 1, and notified to the UE 1. For example, a policy control function (PCF) network element in a 5G core network configures a security policy for the UE 1 and notifies the UE of the security policy. Alternatively, the security policy of the UE 1 may be configured by an application function (AF) network element for the UE 1 and notified to the UE 1. Alternatively, the security policy of the UE 1 may be configured by an AF network element for the UE 1, and notified to the UE 1 by using a PCF network element. Alternatively, the security policy of the UE 1 may be obtained by the core network device from a unified data management (UDM) network element and sent to the UE. Alternatively, the security policy of the UE 1 may be preconfigured by a network operator on a UE. How the UE obtains a respective control plane security policy is not limited.

The direct communication request message may further include a security capability of the UE 1, and the security capability of the UE 1 may include a list of security algorithms supported by the UE 1 in the PC5 unicast connection. The list of security algorithms includes a list of integrity protection algorithms and a list of confidentiality protection algorithms. The list of integrity protection algorithms includes one or more non-null and/or null integrity protection algorithms, and the list of confidentiality protection algorithms includes one or more non-null and/or null confidentiality protection algorithms.

Optionally, the direct communication request message may further include a random number 1 generated by the UE 1, and the random number 1 may be used for generating a session key $K_{NRP\text{-}secs}$.

Step 402: The UE 2 determines a control plane security protection mode between the UE 2 and the UE 1, and selects a security algorithm.

The UE 2 determines a control plane security protection mode between the UE 2 and the UE 1 based on a control plane security policy of the UE 1 and a control plane security policy of the UE 2, that is, determines a control plane security protection mode for the PC5 unicast connection. For a process in which the UE 2 determines whether to enable control plane integrity protection and whether to enable control plane confidentiality protection, refer to detailed descriptions of related steps in FIG. 1. Details are not described herein again. When control plane integrity protection is not enabled, neither control plane confidentiality protection nor user plane security protection is enabled by default.

To resolve the problem that user plane confidentiality protection cannot be performed by using an effective confidentiality protection algorithm when control plane confidentiality protection is not enabled but user plane confidentiality protection is enabled, the control plane security protection mode determined by the UE 2 is that control plane integrity protection is enabled and control plane confidentiality protection is not enabled.

Further, the UE 2 selects a security algorithm based on the determined control plane security protection mode, the security capability of the UE 1, and a security capability of the UE 2. For a process in which the UE 2 selects the security algorithm, refer to detailed descriptions of related steps in FIG. 1. Details are not described herein again. For example, if the control plane security protection mode is that control plane integrity protection is enabled and control plane confidentiality protection is not enabled, the UE 2 selects a non-null integrity protection algorithm and a null confidentiality protection algorithm based on security capabilities of UEs at both ends.

Optionally, the UE 2 stores the security capability of the UE 1. If the UE 2 determines to enable control plane integrity protection, but not to enable control plane confidentiality protection, the UE 2 stores the security capability of the UE 1. Therefore, when determining to enable user plane confidentiality protection, the UE 2 may select a non-null confidentiality protection algorithm based on the stored security capability of the UE 1. If the UE 2 determines to enable control plane confidentiality protection, the UE 2 may store the security capability of the UE 1 or may not store the security capability of the UE 1. If the UE 2 stores the security capability of the UE 1, it can be ensured that when both user plane security and control plane security protection are enabled, and different security protection algorithms can be used, the UE 2 may further select a to-be-used security protection algorithm based on the pre-stored security capability of the UE 1, to prevent the security capability of the UE 1 from being sent in a signaling message again. If the UE 2 does not store the security capability of the UE 1, the storage load of the UE 2 can be reduced.

Optionally, when determining that control plane integrity protection is enabled, the UE 2 enables control plane confidentiality protection; or when determining that control plane confidentiality protection is enabled, the UE 2 enables control plane integrity protection. The UE 2 selects a non-null integrity protection algorithm and a non-null confidentiality protection algorithm based on the security capability of the UE 1 and a security capability of the UE 2. For example, if the UE 2 decides to enable control plane integrity protection, the UE 2 enables control plane confidentiality protection and selects a non-null integrity protection algorithm and a non-null confidentiality protection algorithm. In this solution, both the UE 1 and the UE 2 select a non-null security protection algorithm in a control plane negotiation phase, to ensure that devices at both ends can obtain a security protection algorithm supporting enabling of user plane security protection.

Optionally, when determining that control plane integrity protection is enabled and control plane confidentiality protection is not enabled, and selecting a null confidentiality protection algorithm based on the security capability of the UE 1 and the security capability of the UE 2, the UE 2 additionally selects an additional non-null confidentiality protection algorithm based on the security capability of the UE 1 and the security capability of the UE 2. It is ensured that devices at both ends can obtain a security protection algorithm supporting enabling of user plane security protection.

Optionally, in step 403, the UE 1 and the UE 2 obtain a shared key. The shared key is $K_{NRP}$.

The shared key is a key known and used by both the UE 1 and the UE 2. For example, this step may be the same as a method for performing mutual authentication and further establishing a key when the UE 2 determines that control plane integrity protection between the UE 2 and the UE 1 needs to be enabled in the conventional technology. That is, refer to step 103 in the embodiment of FIG. 1. UE 2 may trigger step 403.

If the direct communication request message includes $K_{NRP}$ ID, the UE 2 determines the shared key $K_{NRP}$ between the UE 2 and the UE 1 based on $K_{NRP}$ ID, and therefore, step 403 may not be performed.

Regardless of whether control plane integrity protection is enabled, the UE 2 can perform step 403. For example, the operator may choose to perform step 403 each time. In another example, in subsequent procedures of the UE 1 and the UE 2, if integrity protection is not performed on a message, the UE 1 and the UE 2 both need to obtain a shared key, so as to perform security protection on the message without integrity protection.

An implementation in which the UE 1 and the UE 2 obtain the shared key is not limited. For example, the UE 1 and the UE 2 may obtain the shared key in the following four manners:

Manner 1: The UE 2 triggers a mutual authentication procedure between the UE 2 and the UE 1 and performs a key establishment procedure between the UE 2 and the UE 1 after the mutual authentication. The mutual authentication procedure is used for verifying identities of both parties. That is, the UE 2 verifies whether the UE 1 is an authorized user, and the UE 1 verifies whether the UE 2 is an authorized user. When both parties are authorized users, a key establishment process is executed, so that both parties can obtain a shared key.

Manner 2: A shared key between the UE 1 and the UE 2 is preconfigured on the UE 1 and the UE 2, and the two ends may obtain the shared key from a preconfiguration when the shared key is needed.

Manner 3: Public and private keys and certificates are preconfigured on the UE 1 and the UE 2, and the two ends may generate a shared key based on the public and private keys and the certificates when the shared key is needed.

A public key of the UE 1, a private key of the UE 1, and a certificate of the UE 1 are configured on the UE 1, and the certificate of UE 1 includes the public key of the UE 1. A public key of the UE 2, a private key of the UE 2, and a certificate of the UE 2 are configured on the UE 2, and the certificate of the UE 2 includes the public key of the UE 2. A procedure of generating a shared key by using public and private keys and certificates may be as follows: Using an example in which the UE 2 initiates a procedure of establishing a shared key, the UE 2 sends the certificate of the UE 2 to the UE 1, and after verifying validity of the certificate of the UE 2, the UE 1 encrypts, by using the public key of the UE 2, shared information 1 provided by the UE 1, and then the UE 1 sends the certificate of the UE 1 and encrypted shared information 1 to the UE 2. After receiving the certificate of the UE 1 and the encrypted shared information 1, and verifying validity of the certificate of the UE 1, the UE 2 decrypts the encrypted shared information 1 by using the private key of the UE 2 to obtain the shared information 1, and generates the shared key by using the shared information 1 obtained through decryption and shared information 2 generated by the UE 2. After the UE 2 encrypts the shared information 2 by using the public key of the UE 1, the UE 2 sends the certificate of the UE 2 and the encrypted shared information 2 to the UE 1. Subsequently, the UE 1 obtains the shared information 2 after decryption, and generates the shared key by using the shared information 2 together with the shared information 1.

Manner 4: The UE 1 and the UE 2 store partial context information. In this case, the UE 1 and the UE 2 may directly obtain a shared key from the partial context information.

When the UE 1 accesses the UE 2 for the first time, the UE 1 and the UE 2 perform a mutual-authentication procedure and a key establishment procedure to obtain a shared key. The UE 1 and the UE 2 may generate a session key $K_{NRP\_sess}$ based on a shared key $K_{NRP}$, a random number 1, and a random number 2, and then continue to generate an encryption key NRPEK and/or an integrity protection key NRPIK through derivation by using the session key $K_{NRP\text{-}sess}$. The UE 1 and the UE 2 perform security protection based on the determined security protection mode by using corresponding keys. After the UE 1 is disconnected from the UE 2, NRPEK and NRPIK are deleted. For example, NRPEK and NRPIK are deleted when context information is deleted. When the UE 1 accesses the UE 2 again, the UE 1 and the UE 2 need to obtain a shared key in context information, to generate NRPEK and/or NRPIK.

Step 404: The UE 2 sends a direct security mode command message to the UE 1. Correspondingly, the UE 1 receives the direct security mode command message from the UE 2.

The direct security mode command message includes second algorithm indication information, and the second algorithm indication information indicates a control plane security algorithm, that is, indicates the security algorithm selected in step 402.

When the selected security algorithm includes a non-null integrity protection algorithm and a null confidentiality protection algorithm, the second algorithm indication information may include an algorithm identifier of the non-null integrity protection algorithm and an algorithm identifier of the null confidentiality protection algorithm. For example, the second algorithm indication information may be represented as {algorithm identifier of non-null integrity protection algorithm, algorithm identifier of null confidentiality protection algorithm}. In another example, the second algorithm indication information may be represented as {[non-null integrity protection algorithm, algorithm identifier], [null confidentiality protection algorithm, algorithm identifier]}. A representation form of the second algorithm indication information is not limited.

Optionally, if the UE 2 enables control plane confidentiality protection when determining that control plane integrity is enabled, or enables control plane integrity protection when determining that control plane confidentiality protection is enabled, and selects a non-null integrity protection algorithm and a non-null confidentiality protection algorithm based on the security capability of the UE 1 and the security capability of the UE 2, the second algorithm indication information includes the selected non-null integrity protection algorithm and the selected non-null confidentiality protection algorithm, so that the non-null security protection algorithm is obtained in a control plane security algorithm negotiation phase. When security protection needs to be enabled on a user plane, the non-null security protection algorithm obtained in the control plane security algorithm negotiation phase may be directly used. For example, if the UE 2 decides to enable control plane integrity protection, the UE 2 enables control plane confidentiality protection and selects a non-null integrity protection algorithm and a non-null confidentiality protection algorithm. In this case, the second algorithm indication information may be represented as {algorithm identifier of non-null integrity protection algorithm, algorithm identifier of non-null confidentiality protection algorithm}.

Optionally, if the UE 2 additionally selects an additional non-null confidentiality protection algorithm based on the security capability of the UE 1 and the security capability of the UE 2 when determining that control plane integrity protection is enabled and control plane confidentiality protection is not enabled, and selecting a null confidentiality protection algorithm based on the security capability of the UE 1 and the security capability of the UE 2, the second algorithm indication information includes an algorithm identifier of the additional non-null confidentiality protection algorithm, so that the non-null security protection algorithm is obtained in the control plane security algorithm negotiation phase. When security protection needs to be enabled on the user plane, the non-null security protection algorithm obtained in the control plane security algorithm negotiation phase may be directly used. For example, if the UE 2 decides to enable control plane integrity protection and not to enable control plane confidentiality protection, the UE 2 selects a non-null integrity protection algorithm and a null confidentiality protection algorithm, and additionally selects an additional non-null confidentiality protection algorithm based on the security capability of the UE 1 and the security capability of the UE 2. In this case, the second algorithm indication information may be represented as {algorithm identifier of non-null integrity protection algorithm, algorithm identifier of null confidentiality protection algorithm, algorithm identifier of additional non-null confidentiality protection algorithm}.

Optionally, the direct security mode command message may further include a random number 2 generated by the UE 2, and the random number 2 may be used for generating an integrity protection key and/or a confidentiality protection key.

Further, the UE 2 determines a protection key. The protection key is used for protecting partial information or all information carried in a direct security mode command message. The protection key may be a shared key $K_{NRP}$ between the UE 2 and the UE 1, or may be a session key $K_{NRP\text{-}sess}$ generated based on the shared key $K_{NRP}$. Alternatively, the protection key may be an integrity protection key (NRPIK) and/or a confidentiality protection key (NRPEK) generated based on the session key $K_{NRP\text{-}sess}$.

When control plane integrity protection is enabled, and control plane confidentiality protection is not enabled, the UE 2 generates an integrity protection key, but does not generate a confidentiality protection key. The integrity protection key is used for performing integrity protection on partial information or all information carried in the direct security mode message. For example, integrity protection is performed on second algorithm indication information by using the integrity protection key.

Step 405: The UE 1 determines a control plane security protection mode between the UE 1 and the UE 2 based on second algorithm indication information.

Optionally, if the second algorithm indication information obtained by the UE 1 includes an additional non-null confidentiality protection algorithm identifier, the UE 1 stores a confidentiality protection algorithm indicated by the non-null confidentiality protection algorithm identifier.

Based on the premise that control plane integrity protection is enabled, when receiving a direct security mode command message, the UE 1 performs integrity protection verification on the direct security mode command message based on the shared key obtained in step 103.

The UE 1 and the UE 2 may negotiate or preconfigure a protection key to be used. If the protection key is a shared key $K_{NRP}$, the UE 1 performs integrity protection verification on the direct security mode command message by using the shared key. If the protection key is a session key $K_{NRP\text{-}sess}$, the UE 1 generates the session key $K_{NRP\text{-}sess}$ based on the shared key $K_{NRP}$, and performs integrity protection verification on the direct security mode command message by using the session key $K_{NRP\_sess}$. If the protection key is an integrity protection key (NRPIK), the UE 1 derives the session key $K_{NRP\_sess}$ based on the random number 1, the random number 2, and the shared key $K_{NRP}$, continues to use the integrity protection key (NRPIK) derived from the session key, and performs integrity protection verification on the direct security mode command message by using the integrity protection key (NRPIK).

When integrity protection verification on the direct security mode command message succeeds, the UE 1 determines a control plane security protection mode between the UE 1 and the UE 2 based on the second algorithm indication information and performs a subsequent procedure to establish a PC5 unicast connection between the UE 1 and the UE 2. Optionally, when integrity protection verification on the direct security mode command message fails, the UE 1 sends a connection establishment rejection message to the UE 2. Correspondingly, the UE 2 receives the connection establishment rejection message from the UE 1. The connection establishment rejection message indicates that the UE 2 refuses to establish a PC5 unicast connection with the UE 1.

If the UE 1 determines, based on the second algorithm indication information, to enable control plane integrity protection and not to enable control plane confidentiality protection, the UE 1 does not generate a confidentiality protection key (NRPEK).

Step 406: The UE 1 sends a direct security mode complete message to the UE 2. Correspondingly, the UE 2 receives the direct security mode complete message from the UE 1.

The direct security command complete message includes a user plane security policy of the UE 1, so that the UE 2 determines a user plane security protection mode between the UE 2 and the UE 1 with reference to the user plane security policy of the UE 1 and a user plane security policy of the UE 2.

Optionally, the direct security command complete message further includes a security capability of the UE 1, so that the UE 2 selects a user plane security algorithm with reference to the security capability of the UE 1 and a security capability of the UE 2 and the user plane security protection mode. If the UE 2 performs the step of storing the security capability of the UE 1 in step 402, the UE 1 does not include the security capability of the UE 1 in the direct security command complete message. If the UE 2 does not perform the step of storing the security capability of the UE 1 in step 402, the UE 1 may include the security capability of the UE 1 in the direct security command complete message.

The UE 1 include the security capability of the UE 1 in the direct security command complete message. The security capability may be carried when the UE 1 determines that control plane confidentiality protection is not enabled, but control plane integrity protection is enabled, or may be carried without any precondition limitation.

Step 407: The UE 2 determines that the user plane security protection mode between the UE 2 and the UE 1 includes that user plane confidentiality protection is enabled, and generates user plane security enabling indication information.

In an implementation, when receiving the direct security mode complete message, the UE 2 determines, based on the user plane security policy of the UE 1 and a user plane security policy of the UE 2, that the user plane security protection mode between the UE 2 and the UE 1 includes that user plane confidentiality protection is enabled. The user plane security protection mode between the UE 2 and the UE 1 is a user plane security protection mode for the current PC5 unicast connection. The UE 2 determines the user plane security protection mode based on user plane security policies of the UEs at the two ends. Refer to corresponding descriptions of determining a control plane security protection mode based on the control plane security policies of the UEs at the two ends in FIG. 1. Details are not described herein again.

In another implementation, when receiving the direct security mode complete message, if control plane confidentiality protection is not enabled in this case, regardless of the user plane security policies of the UEs at the two ends, the UE 2 determines, by default, that the user plane security protection mode between the UE 2 and the UE 1 includes that user plane confidentiality protection is not enabled, that is, user plane confidentiality protection is not enabled by default. This avoids a case in which there is no negotiated non-null confidentiality protection algorithm when a user plane needs confidentiality protection because the non-null confidentiality protection algorithm is not obtained in a control plane security algorithm negotiation phase.

In another implementation, when receiving the direct security mode complete message, regardless of user plane confidentiality and/or integrity protection policies of the UEs at the two ends, the UE 2 determines, by default, that user plane confidentiality and/or integrity protection modes between the UE 2 and the UE 1 are consistent with control plane confidentiality and/or integrity protection modes, that is, the user plane confidentiality protection mode and/or user plane integrity protection mode are consistent with the control plane confidentiality protection mode and/or control plane integrity protection mode by default, to avoid a case in which there is no negotiated non-null security protection algorithm when security protection needs to be enabled on a user plane because the non-null security protection algorithm is not obtained in a control plane security algorithm negotiation phase, in addition, simplify user plane policy negotiation logic of the UE, thereby improving the processing efficiency. Regardless of user plane confidentiality protection policies of the UEs at the two ends, the UE 2 may determine, by default, that a user plane confidentiality protection mode between the UE 2 and the UE 1 is consistent with a control plane confidentiality protection mode between the UE 2 and the UE 1. Alternatively, regardless of user plane integrity protection policies of the UEs at the two ends, the UE 2 may determine, by default, that a user plane integrity protection mode between the UE 2 and the UE 1 is consistent with a control plane integrity protection mode between the UE 2 and the UE 1. Alternatively, regardless of user plane confidentiality and integrity protection policies of the UEs at the two ends, the UE 2 may determine, by default, that user plane confidentiality and integrity protection modes between the UE 2 and the UE 1 are consistent with control plane confidentiality and integrity protection modes between the UE 2 and the UE 1. For example, if control plane integrity protection is enabled, and control plane confidentiality protection is not enabled, user plane integrity protection is also enabled, and user plane confidentiality protection is also not enabled. In another example, if control plane integrity protection is enabled, and control plane confidentiality protection is not enabled, the UE 2 decides only that user plane confidentiality protection is not enabled, and user plane integrity protection is determined based on user plane integrity protection policies at the two ends.

When determining the user plane security protection mode, the UE 2 generates user plane security enabling indication information, to indicate whether to enable user plane integrity protection and whether to enable user plane confidentiality protection. For example, if the user plane security protection mode is that user plane integrity protection is enabled, and user plane confidentiality protection is enabled, the generated user plane security enabling indication information indicates to enable user plane integrity protection and enable user plane confidentiality protection. In another example, if the user plane security protection mode is that user plane integrity protection is not enabled, and user plane confidentiality protection is enabled, the generated user plane security enabling indication information is used to indicate not to enable user plane integrity protection and enable user plane confidentiality protection.

Step 408: The UE 2 selects a user plane security algorithm based on the user plane security protection mode, the security capability of the UE 1, and a security capability of the UE 2 when the user plane security protection mode is inconsistent with the control plane security protection mode.

In this case, the security capability of the UE 1 may be the security capability of the UE 1 that is stored by the UE 2 in step 402 or may be sent by the UE 1 to the UE 2 in step 406.

That the user plane security protection mode is inconsistent with the control plane security protection mode may include any one of the following cases:

(1) A control plane integrity protection enabling manner is consistent with a user plane integrity protection enabling manner, but a control plane confidentiality protection enabling manner is inconsistent with a user plane confidentiality protection enabling manner. For example, control plane integrity protection is enabled, control plane confidentiality protection is not enabled, user plane integrity protection is enabled, and user plane confidentiality protection is enabled.

(2) A control plane integrity protection enabling manner is inconsistent with a user plane integrity protection enabling manner, but a control plane confidentiality protection enabling manner is consistent with a user plane confidentiality protection enabling manner. For example, control plane integrity protection is enabled, control plane confidentiality protection is enabled, user plane integrity protection is not enabled, and user plane confidentiality protection is enabled.

(3) A control plane integrity protection enabling manner is inconsistent with a user plane integrity protection enabling manner, but a control plane confidentiality protection enabling manner is inconsistent with a user plane confidentiality protection enabling manner. For example, control plane integrity protection is enabled, control plane confidentiality protection is enabled, and user plane integrity protection is not enabled, and user plane confidentiality protection is not enabled.

A user plane security protection mode being inconsistent with a control plane security protection mode may include:

The user plane security protection mode includes that user plane confidentiality protection is enabled, and the control plane security protection mode is that control plane integrity protection is enabled, and control plane confidentiality protection is not enabled. For example, refer to the following Table 2.

TABLE 2

| No. | Control plane security protection mode | | User plane security protection mode | |
|---|---|---|---|---|
| | Integrity protection | Confidentiality protection | Integrity protection | Confidentiality protection |
| 1 | Enabled | Not enabled | Enabled | Enabled |
| 2 | | | Not enabled | Enabled |

In Table 2, "inconsistent" indicated by the number 1 means that enabling of user plane confidentiality protection is inconsistent with not enabling of control plane confidentiality protection; and "inconsistent" indicated by the number 2 means that enabling of user plane confidentiality protection is inconsistent with not enabling of control plane confidentiality protection, and not enabling of user plane integrity protection is inconsistent with enabling of control plane integrity protection.

For the number 1, the UE 2 selects, based on the user plane security protection mode, the security capability of the UE 1, and the security capability of the UE 2, a non-null integrity protection algorithm as the user plane integrity protection algorithm, and selects a non-null confidentiality protection algorithm as the user plane confidentiality protection algorithm. It should be noted that the non-null integrity protection algorithm selected in step 408 may be the same as or different from the non-null integrity protection algorithm selected in step 402. If the non-null integrity protection algorithm selected in step 408 is the same as the non-null integrity protection algorithm selected in step 402, the integrity protection algorithm used on the control plane may be directly used, and a selection step is omitted, so as to reduce the time consumed by the UE 2 for selecting the integrity protection algorithm and simplify processing logic of the UE 2 to improve terminal performance. If the non-null integrity protection algorithm selected in step 408 is different from the non-null integrity protection algorithm selected in step 402, security may be improved.

For the number 2, the UE 2 selects, based on the user plane security protection mode, the security capability of the UE 1, and the security capability of the UE 2, a non-null integrity protection algorithm as the user plane integrity protection algorithm.

Further, when selecting a non-null confidentiality protection algorithm, the UE 2 generates a confidentiality protection key (NRPEK). If a non-null integrity protection algorithm is further selected, an integrity protection key (NRPIK) may be further generated, or an integrity protection key generated during control plane negotiation may be obtained.

Optionally, when control plane integrity protection is enabled, that a user plane security protection mode is inconsistent with a control plane security protection mode may further include several cases shown in Table 3.

TABLE 3

| No. | Control plane security protection mode | | User plane security protection mode | |
|---|---|---|---|---|
| | Integrity protection | Confidentiality protection | Integrity protection | Confidentiality protection |
| 3 | Enabled | Not enabled | Not enabled | Not enabled |
| 4 | Enabled | Enabled | Not enabled | Enabled |
| 5 | | | Enabled | Not enabled |
| 6 | | | Not enabled | Not enabled |

For numbers 3 and 6, the UE 2 selects a null confidentiality protection algorithm and a null integrity protection algorithm as the user plane confidentiality protection algorithm and the user plane integrity protection algorithm. Alternatively, the UE 2 does not select a security algorithm, so as to simplify processing logic of the UE 2, thereby improving terminal performance.

For the number 4, the UE 2 selects a non-null confidentiality protection algorithm as the user plane confidentiality protection algorithm. The user plane confidentiality protection algorithm may be the same as or different from the control plane confidentiality protection algorithm. If the user plane confidentiality protection algorithm is same as the control plane confidentiality protection algorithm, the confidentiality protection algorithm used on the control plane may be directly used, and a selection step is omitted, so as to reduce the time consumed by the UE 2 for selecting the confidentiality protection algorithm and simplify processing logic of the UE 2 to improve terminal performance.

For number 5, the UE 2 selects a non-null integrity protection algorithm as the user plane integrity protection algorithm. The user plane integrity protection algorithm may be the same as or different from the control plane integrity protection algorithm. If the user plane integrity protection algorithm is the same as the control plane integrity protection algorithm, the integrity protection algorithm used on the control plane may be directly used, and a selection step is omitted, so as to reduce the time consumed by the UE 2 for selecting the integrity protection algorithm and simplify processing logic of the UE 2 to improve terminal performance.

In an implementation, regardless of the user plane security protection mode, the UE 2 selects a non-null confidentiality protection algorithm by default. Therefore, when determining that user plane confidentiality protection is enabled, the UE 1 may perform confidentiality protection based on the confidentiality protection algorithm. Optionally, the UE 2 selects a non-null integrity protection algorithm by default. Therefore, when determining that user plane integrity protection is enabled, the UE 1 may perform integrity protection based on the integrity protection algorithm. In this implementation, if security protection is not enabled, a null security protection algorithm is selected by default, or no security algorithm is selected, to simplify processing logic of the UE 2, thereby improving terminal performance.

In another implementation, if the UE 2 determines, by default based on that control plane confidentiality protection is not enabled, that user plane confidentiality protection is not enabled, the UE 2 selects a null confidentiality protection algorithm as the user plane confidentiality protection algorithm, or does not select a security algorithm, to simplify processing logic of the UE 2, thereby improving terminal performance.

In another implementation, if the UE 2 determines, by default, that the user plane confidentiality and/or integrity protection modes between the UE 2 and the UE 1 are consistent with the control plane confidentiality and/or integrity protection modes, and if the UE 2 determines, based on that control plane confidentiality protection is enabled, that the user plane confidentiality protection mode is that confidentiality protection is enabled, the selected user plane confidentiality protection algorithm may be consistent with the control plane confidentiality protection algorithm, or may be a different non-null confidentiality protection algorithm. If the UE 2 determines, based on that control plane integrity protection is enabled, that the user plane integrity protection mode is that integrity protection is enabled, the selected user plane integrity protection algorithm may be consistent with the control plane integrity protection algorithm, or may be a different non-null integrity protection algorithm. If the user plane security protection mode determined by the UE 2 is "not enabled", a null security protection algorithm is selected, or no security protection algorithm is selected, to simplify processing logic of the UE 2, thereby improving terminal performance.

Optionally, when the user plane security protection mode is consistent with the control plane security protection mode, the UE 2 selects a user plane security algorithm based on the user plane security protection mode, the security capability of the UE 1, and the security capability of the UE 2. The selected user plane security algorithm may be consistent with the control plane security algorithm, or may be inconsistent with the control plane security algorithm.

Step 409: The UE 2 sends a direct communication accept message to the UE 1. Correspondingly, the UE 1 receives the direct communication accept message from the UE 2.

Optionally, step 409 may also be that the UE 2 sends a direct rekeying response (direct rekeying Response) message to the UE 1. Correspondingly, the UE 1 receives the direct rekeying request from the UE 2.

Optionally, step 409 may also be that the UE 2 sends an RRC connection reconfiguration message to the UE 1. Correspondingly, the UE 1 receives the RRC connection reconfiguration message from the UE 2.

The direct communication accept message includes user plane security enabling indication information and first algorithm indication information indicating a user plane security algorithm. The user plane security enabling indication information indicates whether to enable user plane integrity protection and whether to enable user plane confidentiality protection. The first algorithm indication information indicates the security algorithm selected in step 408. Optionally, a first algorithm identifier may be carried only when the user plane security protection mode is inconsistent with the control plane security protection mode, or there may be no such limitation.

For the number 1, the UE 1 determines, based on the user plane security enabling indication information, to enable user plane confidentiality protection and user plane integrity protection. The first algorithm indication information includes an algorithm identifier of a non-null confidentiality protection algorithm, indicating the selected non-null confidentiality protection algorithm. If the non-null control plane integrity protection algorithm is the same as the user plane integrity protection algorithm, the first algorithm indication information may include or not include the non-null integrity protection algorithm. If the non-null integrity protection algorithm is not included, when determining, based on the user plane security enabling indication information, to enable user plane integrity protection, the UE 1 uses the control plane integrity protection algorithm as the user plane integrity protection algorithm by default. If the non-null integrity protection algorithm is included, when determining, based on the user plane security enabling indication information, to enable user plane integrity protection, the UE 1 determines the user plane integrity protection algorithm based on the algorithm identifier of the non-null user plane integrity protection algorithm in the first algorithm indication information. If the control plane integrity protection algorithm is different from the user plane integrity protection algorithm, the first algorithm indication information includes a non-null integrity protection algorithm, and the integrity protection algorithm is different from the control plane integrity protection algorithm.

For the number 2, the UE 1 determines, based on the user plane security enabling indication information, not to enable user plane integrity protection, but to enable user plane confidentiality protection. The first algorithm indication information includes an algorithm identifier of a non-null confidentiality protection algorithm and an algorithm identifier of a null integrity protection algorithm, or the first algorithm indication information does not include an algorithm identifier of an integrity protection algorithm. The algorithm identifier of the non-null confidentiality protection algorithm indicates a selected non-null confidentiality protection algorithm. The algorithm identifier of the null integrity protection algorithm indicates a selected null integrity protection algorithm. Optionally, the first algorithm indication information includes an algorithm identifier of a non-null confidentiality protection algorithm, but does not include an algorithm identifier of an integrity protection algorithm. When determining, based on the user plane security enabling indication information, not to enable user plane integrity protection, the UE 1 does not perform user plane integrity protection by default, or uses a null integrity protection algorithm by default.

For the number 3, the UE 1 determines, based on the user plane security enabling indication information, not to enable user plane integrity protection and user plane confidentiality protection. The first algorithm indication information indicates a null confidentiality protection algorithm and a null integrity protection algorithm, or the first algorithm indication information does not include an algorithm identifier of an integrity protection algorithm, or the first algorithm indication information does not include an algorithm identifier of a confidentiality protection algorithm, or the first algorithm indication information carries neither an algorithm identifier of an integrity protection algorithm nor an algorithm identifier of a confidentiality protection algorithm. Optionally, the first algorithm indication information may not be carried.

For the number 4, the UE 1 determines, based on the user plane security enabling indication information, not to enable user plane integrity protection, but to enable user plane confidentiality protection. The first algorithm indication information includes an algorithm identifier of a non-null confidentiality protection algorithm and an algorithm identifier of a null integrity protection algorithm, or the first algorithm indication information does not include an algorithm identifier of an integrity protection algorithm, or the first algorithm indication information does not include an algorithm identifier of a confidentiality protection algorithm, or the first algorithm indication information carries neither an algorithm identifier of an integrity protection algorithm nor an algorithm identifier of a confidentiality protection algorithm. The non-null confidentiality protection algorithm may be the same as or different from the control plane confidentiality protection algorithm. If the non-null confidentiality protection algorithm is the same as the control plane confidentiality protection algorithm, the first algorithm indication information may not carry an algorithm identifier of the non-null confidentiality protection algorithm. When determining, based on the user plane security enabling indication information, to enable user plane confidentiality protection, the UE 1 uses the control plane confidentiality protection algorithm by default. If the non-null confidentiality protection algorithm is different from the control plane confidentiality protection algorithm, the first algorithm indication information includes an algorithm identifier of the non-null confidentiality protection algorithm, and the confidentiality protection algorithm is different from the control plane confidentiality protection algorithm, to improve security. Optionally, the first algorithm indication information may not be carried.

For the number 5, the UE 1 determines, based on the user plane security enabling indication information, to enable user plane integrity protection but not to enable user plane confidentiality protection. The first algorithm indication information includes an algorithm identifier of a non-null integrity protection algorithm and an algorithm identifier of a null confidentiality protection algorithm, or the first algorithm indication information does not include an algorithm identifier of a confidentiality protection algorithm, or the first algorithm indication information does not include an algorithm identifier of an integrity protection algorithm, or the first algorithm indication information carries neither an algorithm identifier of a confidentiality protection algorithm nor an algorithm identifier of an integrity protection algorithm. The non-null integrity protection algorithm may be the same as or different from the control plane integrity protection algorithm. If the non-null integrity protection algorithm is the same as the control plane integrity protection algorithm, the first algorithm indication information may not carry an algorithm identifier of the non-null integrity protection algorithm. When determining, based on the user plane security enabling indication information, to enable user plane integrity protection, the UE 1 uses the control plane integrity protection algorithm by default, to reduce a message length. If the non-null integrity protection algorithm is different from the control plane integrity protection algorithm, the first algorithm indication information includes an algorithm identifier of the non-null integrity protection algorithm, and the integrity protection algorithm is different from the control plane integrity protection algorithm, to improve security. Optionally, the first algorithm indication information may not be carried.

For the number 6, the UE 1 determines, based on the user plane security enabling indication information, not to enable user plane integrity protection and user plane confidentiality protection. The first algorithm indication information indicates a null confidentiality protection algorithm and a null integrity protection algorithm or does not carry an algorithm identifier of a confidentiality protection algorithm or does not carry an algorithm identifier of an integrity protection algorithm, or carries neither an algorithm identifier of a confidentiality protection algorithm nor an algorithm identifier of an integrity protection algorithm. Optionally, the first algorithm indication information may not be carried.

In an implementation, regardless of the user plane security protection mode, the first algorithm indication information indicates a non-null confidentiality protection algorithm by default, so that the UE 1 can perform confidentiality protection based on the confidentiality protection algorithm when determining that user plane confidentiality protection is enabled. Optionally, the first algorithm indication information further indicates a non-null integrity protection algorithm by default. Therefore, when determining that user plane integrity protection is enabled, the UE 1 may perform integrity protection based on the integrity protection algorithm.

In another implementation, if the UE 2 selects a null confidentiality protection algorithm by default based on that control plane confidentiality protection is not enabled, the first algorithm indication information includes the null confidentiality protection algorithm. Optionally, the first algorithm indication information is not carried.

In another implementation, if the UE 2 determines, by default, that the user plane security protection mode is consistent with the control plane security protection mode, and the selected user plane confidentiality and integrity protection algorithms are the same as those of the control plane, the first algorithm indication information is consistent with the second algorithm indication information. Optionally, the first algorithm indication information may not be carried. If the UE 2 determines, by default, that the user plane security protection mode is consistent with the control plane security protection mode, and the selected non-null protection algorithm of the user plane is different from the non-null protection algorithm of the control plane, the first algorithm indication information includes an algorithm identifier of a non-null confidentiality and/or integrity protection algorithm different from that on the control plane. If the UE 2 determines by default that only the user plane confidentiality protection mode is consistent with the control plane confidentiality protection mode, and the selected user plane confidentiality protection algorithm is the same as the control plane confidentiality protection algorithm, the first algorithm indication information includes an algorithm identifier of a confidentiality protection algorithm that is the same as the control plane confidentiality protection algorithm. Optionally, the first algorithm indication information may not include an algorithm identifier of a confidentiality protection algorithm that is the same as that of the control plane. If the UE 2 determines, by default, that only a user plane integrity protection mode is consistent with a control plane integrity protection mode, and a selected user plane integrity protection algorithm is the same as a control plane integrity protection algorithm, the first algorithm indication information includes an algorithm identifier of an integrity protection algorithm that is the same as that of the control plane. Optionally, the first algorithm indication information may not include an algorithm identifier of an integrity protection algorithm that is the same as that of the control plane.

Optionally, when the user plane security protection mode of the UE 2 is consistent with the control plane security protection mode, the user plane security algorithm selected in step 409, that is, the user plane security algorithm selected by the UE 2, may be consistent with the control plane security algorithm, or may be inconsistent with the control plane security algorithm. If the selected algorithm is consistent with the control plane security algorithm, the first algorithm indication information may be carried, where the first algorithm indication information includes an algorithm identifier of the selected user plane confidentiality protection algorithm and an algorithm identifier of the integrity protection algorithm, or the first algorithm indication information may not be carried. If the selected user plane security algorithm is inconsistent with the control plane security algorithm, the first algorithm indication information needs to be carried, including an algorithm identifier of the user plane confidentiality protection algorithm and an algorithm identifier of the user plane integrity protection algorithm.

Optionally, if the UE 2 additionally selects an additional non-null confidentiality protection algorithm based on the security capability of the UE 1 and the security capability of the UE 2 when determining that control plane integrity protection is enabled and control plane confidentiality protection is not enabled, and selecting a null confidentiality protection algorithm based on the security capability of the UE 1 and the security capability of the UE 2, a first algorithm identifier may not be carried in this case.

Step 410: The UE 1 determines a user plane security protection mode between the UE 1 and the UE 2 based on the user plane security enabling indication information, and determines the user plane security algorithm based on the first algorithm indication information.

When receiving the direct communication accept message, the UE 1 determines the user plane security protection mode between the UE 1 and the UE 2 based on the user plane security enabling indication information. If the direct communication accept message carries the first algorithm indication information, the UE 1 determines the user plane security algorithm based on the first algorithm indication information. If the direct communication accept message does not carry the first algorithm indication information, a security algorithm the same as the security algorithm used by the control plane is used.

For example, if the user plane security protection mode is that user plane integrity protection is enabled and user plane confidentiality protection is enabled, and the first algorithm indication information indicates a non-null integrity protection algorithm and a non-null confidentiality protection algorithm, the UE 1 performs integrity protection on the first user plane data by using a non-null integrity protection algorithm and an integrity protection key, and confidentiality protects the first user plane data by using a non-null confidentiality protection algorithm and a confidentiality protection key, thereby implementing security protection on user plane data. The first user plane data herein refers to user plane data sent by the UE 1 to the UE 2. For second user plane data sent by the UE 2 to the UE 1, the UE 1 may perform integrity protection verification on the second user plane data by using a non-null integrity protection algorithm and an integrity protection key, and decrypt the second user plane data by using a non-null confidentiality protection algorithm and a confidentiality protection key.

In another example, if the user plane security protection mode is disabling user plane integrity protection and enabling user plane confidentiality protection, and the first algorithm indication information indicates a null integrity protection algorithm and a non-null confidentiality protection algorithm, the UE 1 does not perform integrity protection on the first user plane data, but confidentiality protects the first user plane data by using the non-null confidentiality protection algorithm and the confidentiality protection key, thereby confidentiality protecting the user plane data.

Optionally, if the second algorithm indication information received by the UE 1 includes an additional non-null confidentiality protection algorithm, and the UE 1 determines, based on the security enabling indication information, that user plane confidentiality protection is enabled, the UE 1 determines to use the additional non-null confidentiality protection algorithm included in the second algorithm indication information as the user plane confidentiality protection algorithm.

The UE 1 may generate a confidentiality protection key when determining that user plane confidentiality protection is enabled. If determining that user plane confidentiality protection is not enabled, the UE 1 does not generate the confidentiality protection key. Optionally, the UE 1 does not execute a corresponding null confidentiality protection algorithm, to save computing resources. When determining that user plane integrity protection is enabled, the UE 1 generates an integrity protection key. When determining that user plane integrity protection is not enabled, the UE 1 does not generate an integrity protection key. Optionally, the UE 1 does not execute a corresponding null integrity protection algorithm, to save computing resources.

In the embodiment shown in FIG. 4, the second algorithm indication information indicates both a control plane security algorithm and a control plane security protection mode, the first algorithm indication information indicates a user plane security algorithm, and the user plane security enabling indication information indicates a user plane security protection mode. The first algorithm indication information indicates a confidentiality protection algorithm to be used on the user plane, so as to effectively confidentiality protect the user plane data.

Figure 5:
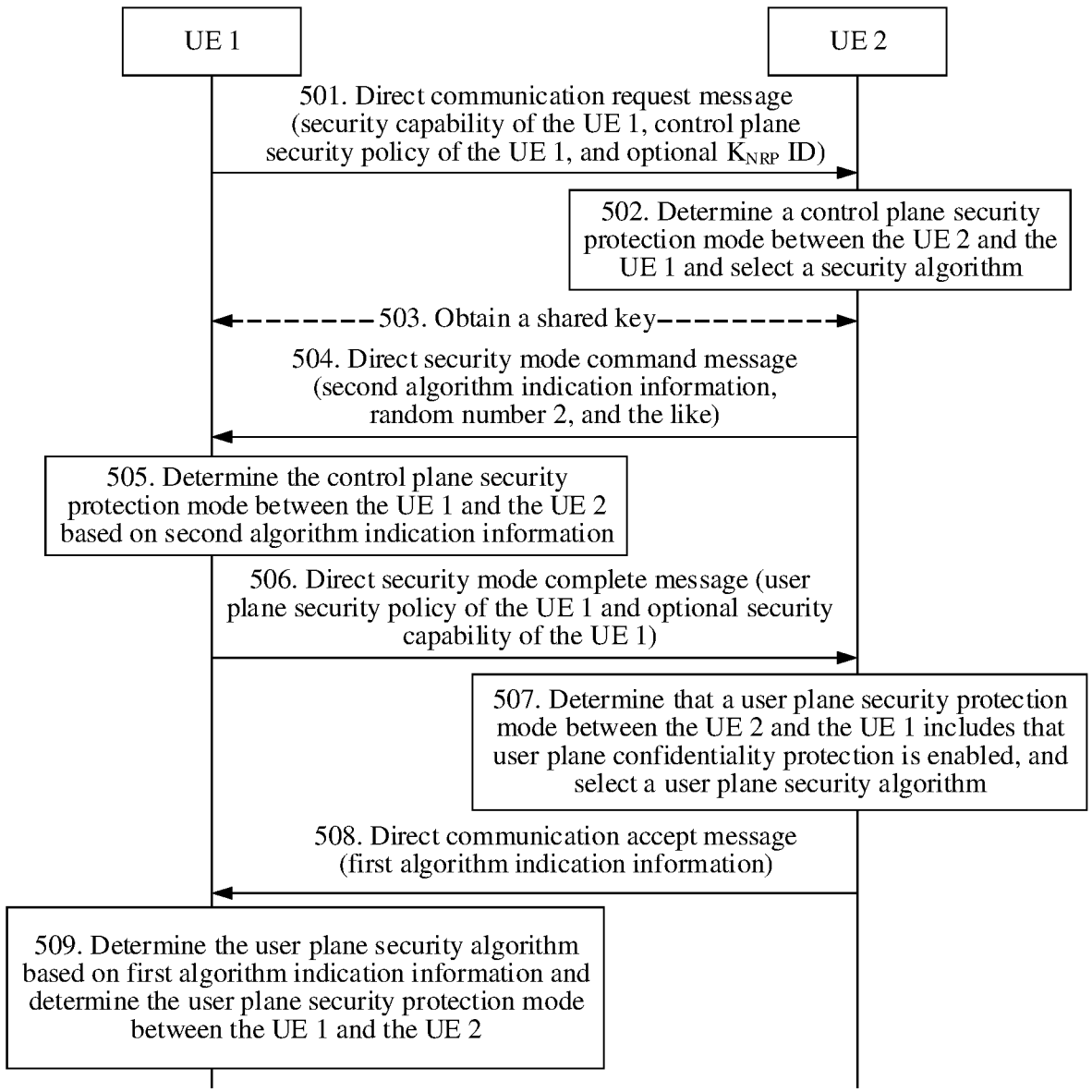
FIG. 5 is a schematic flowchart of a method for determining a user plane security algorithm according to Embodiment 2.

FIG. 5 is a schematic flowchart of a method for determining a user plane security algorithm according to Embodiment 2. For parts that are the same as or similar to those in FIG. 4 in the procedure shown in FIG. 5, refer to corresponding descriptions in the embodiment shown in FIG. 4. The procedure may include, but is not limited to, the following steps.

Step 501: UE 1 sends a direct communication request message to UE 2. Correspondingly, the UE 2 receives the direct communication request message from the UE 1.

Optionally, step 501 may alternatively be that the UE 1 sends a direct rekeying request message to the UE 2. Correspondingly, the UE 2 receives the direct rekeying request from the UE 1. In this case, the message does not include the control plane security policy of UE 1.

Step 502: The UE 2 determines a control plane security protection mode between the UE 2 and the UE 1, and selects a security algorithm.

Optionally, in step 503, the UE 1 and the UE 2 obtain a shared key. The shared key is $K_{NRP}$.

Step 504: The UE 2 sends a direct security mode command message to the UE 1. Correspondingly, the UE 1 receives the direct security mode command message from the UE 2.

Step 505: The UE 1 determines a control plane security protection mode between the UE 1 and the UE 2 based on second algorithm indication information.

Step 506: The UE 1 sends a direct security mode complete message to the UE 2. Correspondingly, the UE 2 receives the direct security mode complete message from the UE 1.

For implementation processes of step 501 to step 506, refer to detailed descriptions of step 401 to step 406 in the embodiment shown in FIG. 4. Details are not described herein again.

Step 507: The UE 2 determines that a user plane security protection mode between the UE 2 and the UE 1 includes that user plane confidentiality protection is enabled and selects a user plane security algorithm.

In an implementation, when receiving the direct security mode complete message, the UE 2 determines, based on the user plane security policy of the UE 1 and a user plane security policy of the UE 2, that the user plane security protection mode between the UE 2 and the UE 1 includes that user plane confidentiality protection is enabled.

In another implementation, when receiving the direct security mode complete message, if control plane confidentiality protection is not enabled in this case, regardless of the user plane security policies of the UEs at the two ends, the UE 2 determines, by default, that the user plane security protection mode between the UE 2 and the UE 1 includes that user plane confidentiality protection is not enabled, that is, user plane confidentiality protection is not enabled by default.

In another implementation, when receiving the direct security mode complete message, regardless of user plane security policies of the UEs at the two ends, the UE 2 determines, by default, that a user plane security protection mode between the UE 2 and the UE 1 is consistent with a control plane security protection mode, that is, a user plane confidentiality protection mode and a user plane integrity protection mode are consistent with a control plane confidentiality protection mode and a control plane integrity protection mode by default.

When determining the user plane security protection mode, the UE 2 selects a user plane security algorithm based on the user plane security protection mode.

When user plane integrity protection is not enabled, the user plane integrity protection algorithm is a null integrity protection algorithm. When user plane confidentiality protection is not enabled, the user plane confidentiality protection algorithm is a null confidentiality protection algorithm.

When control plane integrity protection is enabled, and user plane integrity protection is also enabled, the user plane integrity protection algorithm and the control plane integrity protection algorithm may be a same non-null integrity protection algorithm, or may be different non-null integrity protection algorithms. If the control plane and the user plane are required to use a same non-null integrity protection algorithm, the UE 2 may perform or may not perform an algorithm selection step. The algorithm selection step is not performed to save processing resources of the UE 2. If the control plane and the user plane are not required to use a same non-null integrity protection algorithm, the UE 2 selects a non-null integrity protection algorithm. The non-null integrity protection algorithm may be different from or the same as the non-null integrity protection algorithm on the control plane. If the protection algorithms are the same, processing logic of the UE can be simplified. If the protection algorithms are different, security can be improved.

When control plane confidentiality protection is enabled, and user plane confidentiality protection is also enabled, the user plane confidentiality protection algorithm and the control plane confidentiality protection algorithm may be a same non-null confidentiality protection algorithm, or may be different non-null confidentiality protection algorithms. If the control plane and the user plane are required to use a same non-null confidentiality protection algorithm, the UE 2 may perform or may not perform an algorithm selection step. If the control plane and the user plane are not required to use a same non-null confidentiality protection algorithm, the UE 2 selects a non-null confidentiality protection algorithm. The non-null confidentiality protection algorithm may be different from or the same as the non-null confidentiality protection algorithm on the control plane.

Example 1

If the user plane security protection mode is that user plane integrity protection is enabled, and user plane confidentiality protection is enabled, the UE 2 selects, based on security capabilities of UEs at both ends, a non-null integrity protection algorithm from a list of supported integrity protection algorithms as the user plane integrity protection algorithm, and selects a non-null confidentiality protection algorithm from a list of supported confidentiality protection algorithms as the user plane confidentiality protection algorithm.

When control plane integrity protection is enabled, and control plane confidentiality protection is not enabled, the user plane integrity protection algorithm may be the same as or different from the control plane integrity protection algorithm. When control plane integrity protection is enabled, and control plane confidentiality protection is enabled, a user plane integrity protection algorithm may be the same as or different from a control plane integrity protection algorithm, and a user plane confidentiality protection algorithm may be the same as or different from a control plane confidentiality protection algorithm.

Example 2

If the user plane security protection mode is that user plane integrity protection is not enabled, and user plane confidentiality protection is enabled, the UE 2 selects, based on security capabilities of UEs at the two ends, a non-null confidentiality protection algorithm from a list of supported confidentiality protection algorithms as the user plane confidentiality protection algorithm, and does not select an integrity protection algorithm or considers an integrity protection algorithm as a null value by default.

When control plane integrity protection is enabled, and control plane confidentiality protection is enabled, the user plane confidentiality protection algorithm may be the same as or different from the control plane confidentiality protection algorithm.

Step 508: The UE 2 sends a direct communication accept message to the UE 1. Correspondingly, the UE 1 receives the direct communication accept message from the UE 2.

Optionally, step 508 may also be that the UE 2 sends a direct rekeying response (direct rekeying Response) message to the UE 1. Correspondingly, the UE 1 receives the direct rekeying request from the UE 2.

Optionally, step 508 may also be that the UE 2 sends an RRC connection reconfiguration message to the UE 1. Correspondingly, the UE 1 receives the RRC connection reconfiguration message from the UE 2.

The direct communication accept message includes first algorithm indication information, indicating the user plane security algorithm selected in step 507, and the first algorithm indication message also indicates a user plane security protection mode.

In an implementation, if the user plane confidentiality protection mode is different from the control plane confidentiality protection mode, the first algorithm indication information includes an algorithm identifier of a user plane confidentiality protection algorithm; otherwise, the first algorithm indication information does not include an algorithm identifier of a user plane confidentiality protection algorithm. If the user plane integrity protection mode is different from the control plane integrity protection mode, the first algorithm indication information includes an algorithm identifier of a user plane integrity protection algorithm; otherwise, the first algorithm indication information does not include an algorithm identifier of a user plane integrity protection algorithm. Optionally, if the user plane security protection mode is consistent with the control plane security protection mode, first algorithm indication information is not carried, or first algorithm indication information that is a null value may be carried.

In this implementation, if the first algorithm indication information carries only an algorithm identifier of a user plane confidentiality protection algorithm, the UE 1 considers by default that a user plane integrity protection mode is consistent with a control plane integrity protection mode, and the UE 1 considers by default that a user plane integrity protection algorithm is consistent with a control plane integrity protection algorithm. If the first algorithm indication information carries only the algorithm identifier of the user plane integrity protection algorithm, the UE 1 considers by default that the user plane confidentiality protection mode is consistent with the control plane confidentiality protection mode, and the UE 1 considers by default that the user plane confidentiality protection algorithm is consistent with the control plane confidentiality protection algorithm. If the first algorithm indication information carries an algorithm identifier of a non-null user plane integrity protection algorithm, the UE 1 enables user plane integrity protection and performs integrity protection on the user plane by using the integrity protection algorithm identified by the algorithm identifier. If the first algorithm indication information carries an algorithm identifier of a null user plane integrity protection algorithm, the UE 1 does not enable user plane integrity protection. Optionally, the UE 1 does not execute the null user plane integrity protection algorithm to save computing resources. If the first algorithm indication information carries an algorithm identifier of a non-null user plane confidentiality protection algorithm, the UE 1 enables user plane confidentiality protection and confidentiality protects the user plane by using the confidentiality protection algorithm identified by the algorithm identifier. If the first algorithm indication information carries an algorithm identifier of a null user plane confidentiality protection algorithm, the UE 1 does not enable user plane confidentiality protection. Optionally, the UE 1 does not execute the null user plane confidentiality protection algorithm to save computing resources.

In another implementation, the first algorithm indication information includes an algorithm identifier of a user plane confidentiality protection algorithm and an algorithm identifier of a user plane integrity protection algorithm by default.

In this implementation, if the first algorithm indication information carries an algorithm identifier of a non-null user plane integrity protection algorithm, the UE 1 enables user plane integrity protection and performs integrity protection on the user plane by using the integrity protection algorithm identified by the algorithm identifier. If the first algorithm indication information carries an algorithm identifier of a null user plane integrity protection algorithm, the UE 1 does not enable user plane integrity protection. Optionally, the UE 1 does not execute the null user plane integrity protection algorithm to save computing resources. If the first algorithm indication information carries an algorithm identifier of a non-null user plane confidentiality protection algorithm, the UE 1 enables user plane confidentiality protection and confidentiality protects the user plane by using the confidentiality protection algorithm identified by the algorithm identifier. If the first algorithm indication information carries an algorithm identifier of a null user plane confidentiality protection algorithm, the UE 1 does not enable user plane confidentiality protection. Optionally, the UE 1 does not execute the null user plane confidentiality protection algorithm to save computing resources.

In another implementation, the first algorithm indication information includes an algorithm identifier of a non-null user plane confidentiality protection algorithm only when user plane confidentiality protection is enabled. The first algorithm indication information includes an algorithm identifier of a non-null user plane integrity protection algorithm only when user plane integrity protection is enabled.

In this implementation, if the first algorithm indication information carries only the algorithm identifier of the user plane confidentiality protection algorithm, the UE 1 considers by default that user plane integrity protection is not enabled, and the UE 1 considers by default that user plane confidentiality protection is enabled, and confidentiality protects the user plane by using the confidentiality protection algorithm identified by the algorithm identifier. If the first algorithm indication information carries only the algorithm identifier of the user plane integrity protection algorithm, the UE 1 considers by default that user plane confidentiality protection is not enabled, and the UE 1 considers by default that user plane integrity protection is enabled, and performs integrity protection on the user plane by using the integrity protection algorithm identified by the algorithm identifier.

For Example 1, when user plane integrity protection is enabled, and user plane confidentiality protection is enabled, the first algorithm indication information may include an algorithm identifier of a non-null integrity protection algorithm and an algorithm identifier of a non-null confidentiality protection algorithm.

For Example 1, when both user plane integrity protection and user plane confidentiality protection are enabled, control plane integrity protection is enabled, and control plane confidentiality protection is not enabled, optionally, the first algorithm indication information includes an algorithm identifier of a non-null confidentiality protection algorithm, and does not include an algorithm identifier of a non-null integrity protection algorithm. When receiving the first algorithm indication information, the UE 1 considers, by default, that a user plane integrity protection enabling manner is consistent with a control plane integrity protection enabling manner, that is, enables user plane integrity protection and uses a control plane integrity protection algorithm as the user plane integrity protection algorithm. If the selected user plane integrity protection algorithm is different from the control plane integrity protection algorithm, the first algorithm indication information includes an algorithm identifier of a non-null integrity protection algorithm and an algorithm identifier of a non-null confidentiality protection algorithm, and the integrity protection algorithm is different from the control plane integrity protection algorithm.

When control plane integrity protection is enabled, and control plane confidentiality protection is enabled, if the user plane integrity protection algorithm is different from the control plane integrity protection algorithm, the first algorithm indication information indicates a non-null user plane integrity protection algorithm; if the user plane confidentiality protection algorithm is different from the control plane confidentiality protection algorithm, the first algorithm indication information indicates a non-null user plane confidentiality protection algorithm; if the user plane integrity protection algorithm is different from the control plane integrity protection algorithm, and the user plane confidentiality protection algorithm is different from the control plane confidentiality protection algorithm, the first algorithm indication information indicates a non-null user plane integrity protection algorithm and a non-null user plane confidentiality protection algorithm.

For Example 2, when user plane integrity protection is not enabled, and user plane confidentiality protection is enabled, the first algorithm indication information includes an algorithm identifier of a null integrity protection algorithm and an algorithm identifier of a non-null confidentiality protection algorithm.

Optionally, the first algorithm indication information includes an algorithm identifier of a non-null confidentiality protection algorithm. When receiving the first algorithm indication information, the UE 1 considers by default that user plane integrity protection is not enabled, and does not perform integrity protection on the user plane data.

When control plane integrity protection is enabled, and control plane confidentiality protection is enabled, if the user plane confidentiality protection algorithm is different from the control plane confidentiality protection algorithm, the first algorithm indication information indicates a non-null user plane confidentiality protection algorithm.

Step 509: The UE 1 determines the user plane security algorithm based on the first algorithm indication information, and determines a user plane security protection mode between the UE 1 and the UE 2.

In an implementation, the first algorithm indication information determined by the UE 1 includes an algorithm identifier of a security algorithm of which a user plane security protection mode is different from a control plane confidentiality protection mode.

In this implementation, if the first algorithm indication information carries only an algorithm identifier of a user plane confidentiality protection algorithm, the UE 1 considers by default that a user plane integrity protection mode is consistent with a control plane integrity protection mode, and the UE 1 considers by default that a user plane integrity protection algorithm is consistent with a control plane integrity protection algorithm. If the first algorithm indication information carries only the algorithm identifier of the user plane integrity protection algorithm, the UE 1 considers by default that the user plane confidentiality protection mode is consistent with the control plane confidentiality protection mode, and the UE 1 considers by default that the user plane confidentiality protection algorithm is consistent with the control plane confidentiality protection algorithm. If the first algorithm indication information carries an algorithm identifier of a non-null user plane integrity protection algorithm, the UE 1 enables user plane integrity protection and performs integrity protection on the user plane by using the integrity protection algorithm identified by the algorithm identifier of the non-null user plane integrity protection algorithm. If the first algorithm indication information carries an algorithm identifier of a null user plane integrity protection algorithm, the UE 1 does not enable user plane integrity protection. Optionally, the UE 1 does not execute the null user plane integrity protection algorithm to save computing resources. If the first algorithm indication information carries an algorithm identifier of a non-null user plane confidentiality protection algorithm, the UE 1 enables user plane confidentiality protection and confidentiality protects the user plane by using the confidentiality protection algorithm identified by the algorithm identifier. If the first algorithm indication information carries an algorithm identifier of a null user plane confidentiality protection algorithm, the UE 1 does not enable user plane confidentiality protection. Optionally, the UE 1 does not execute the null user plane confidentiality protection algorithm to save computing resources.

In another implementation, the first algorithm indication information includes an algorithm identifier of a user plane confidentiality protection algorithm and an algorithm identifier of a user plane integrity protection algorithm by default.

In this implementation, if the first algorithm indication information carries an algorithm identifier of a non-null user plane integrity protection algorithm, the UE 1 enables user plane integrity protection and performs integrity protection on the user plane by using the integrity protection algorithm identified by the algorithm identifier. If the first algorithm indication information carries an algorithm identifier of a null user plane integrity protection algorithm, the UE 1 does not enable user plane integrity protection. Optionally, the UE 1 does not execute the null user plane integrity protection algorithm to save computing resources. If the first algorithm indication information carries an algorithm identifier of a non-null user plane confidentiality protection algorithm, the UE 1 enables user plane confidentiality protection and confidentiality protects the user plane by using the confidentiality protection algorithm identified by the algorithm identifier. If the first algorithm indication information carries an algorithm identifier of a null user plane confidentiality protection algorithm, the UE 1 does not enable user plane confidentiality protection. Optionally, the UE 1 does not execute the null user plane confidentiality protection algorithm to save computing resources.

In another implementation, the first algorithm indication information includes an algorithm identifier of a non-null user plane confidentiality protection algorithm only when user plane confidentiality protection is enabled. The first algorithm indication information includes an algorithm identifier of a non-null user plane integrity protection algorithm only when user plane integrity protection is enabled.

In this implementation, if the first algorithm indication information carries only the algorithm identifier of the user plane confidentiality protection algorithm, the UE 1 considers by default that user plane integrity protection is not enabled, and the UE 1 considers by default that user plane confidentiality protection is enabled, and confidentiality protects the user plane by using the confidentiality protection algorithm identified by the algorithm identifier. If the first algorithm indication information carries only the algorithm identifier of the user plane integrity protection algorithm, the UE 1 considers by default that user plane confidentiality protection is not enabled, and the UE 1 considers by default that user plane integrity protection is enabled, and performs integrity protection on the user plane by using the integrity protection algorithm identified by the algorithm identifier.

In this implementation, if the first algorithm indication information carries only the algorithm identifier of the user plane confidentiality protection algorithm, the UE 1 considers by default that user plane integrity protection is not enabled, and the UE 1 considers by default that user plane confidentiality protection is enabled, and confidentiality protects the user plane by using the confidentiality protection algorithm identified by the algorithm identifier. If the first algorithm indication information carries only the algorithm identifier of the user plane integrity protection algorithm, the UE 1 considers by default that user plane confidentiality protection is not enabled, and the UE 1 considers by default that user plane integrity protection is enabled, and performs integrity protection on the user plane by using the integrity protection algorithm identified by the algorithm identifier.

Further, the UE 1 may generate a confidentiality protection key when determining that user plane confidentiality protection is enabled. If determining that user plane confidentiality protection is not enabled, the UE 1 does not generate the confidentiality protection key. Optionally, the UE 1 does not execute a corresponding null confidentiality protection algorithm, to save computing resources. When determining that user plane integrity protection is enabled, the UE 1 generates an integrity protection key. When determining that user plane integrity protection is not enabled, the UE 1 does not generate an integrity protection key. Optionally, the UE 1 does not execute a corresponding null integrity protection algorithm, to save computing resources.

When determining the user plane security algorithm and the user plane security protection mode, the UE 1 performs security protection on first user plane data based on the confidentiality protection key and/or the integrity protection key, and performs security deprotection on the second user plane data based on the confidentiality protection key and/or the integrity protection key. The first user plane data is user plane data sent by the UE 1 to the UE 2, and the second user plane data is user plane data sent by the UE 2 to the UE 1.

In the embodiment shown in FIG. 5, the second algorithm indication information indicates both a control plane security algorithm and a control plane security protection mode, the first algorithm indication information indicates both a user plane security algorithm and a user plane security protection mode. The first algorithm indication information indicates a confidentiality protection algorithm to be used on the user plane, and indicates a user plane security protection mode, so as to effectively confidentiality protect the user plane data while reducing signaling overheads.

Figure 6:
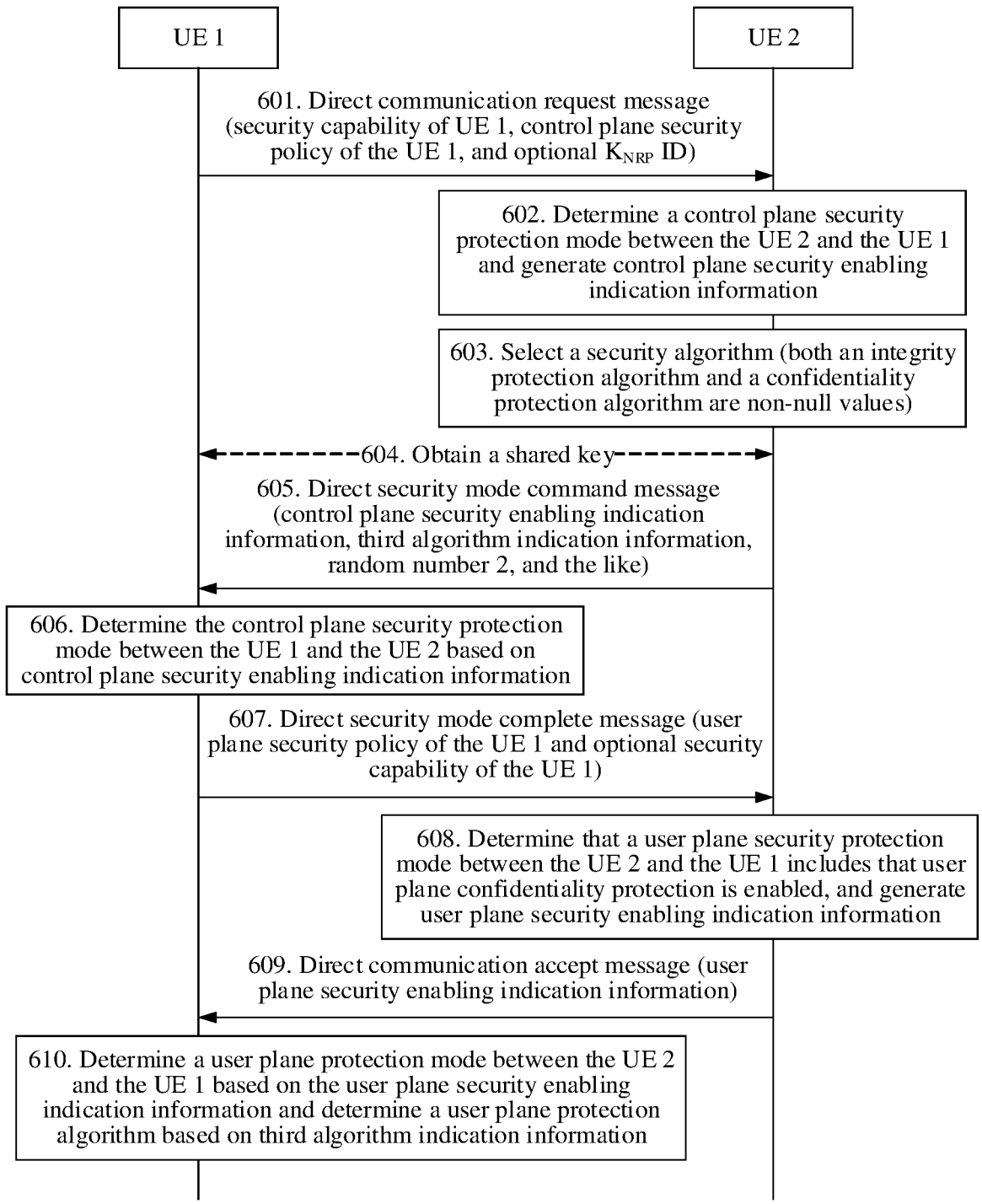
FIG. 6 is a schematic flowchart of a method for determining a user plane security algorithm according to Embodiment 3.

FIG. 6 is a schematic flowchart of a method for determining a user plane security algorithm according to Embodiment 3. For parts that are the same as or similar to those in FIG. 4 or FIG. 5 in the procedure shown in FIG. 6, refer to corresponding descriptions in the embodiments shown in FIG. 4 and FIG. 5. The procedure may include, but is not limited to, the following steps.

Step 601: UE 1 sends a direct communication request message to UE 2. Correspondingly, the UE 2 receives the direct communication request message from the UE 1.

Optionally, step 601 may alternatively be that the UE 1 sends a direct rekeying request message to the UE 2. Correspondingly, the UE 2 receives the direct rekeying request from the UE 1. In this case, the message does not include the control plane security policy of UE 1.

For an implementation process of step 601, refer to detailed descriptions of step 401 in the embodiment shown in FIG. 4. Details are not described herein again.

Step 602: The UE 2 determines a control plane security protection mode between the UE 2 and the UE 1, and generates control plane security enabling indication information.

Step 602 differs from step 402 in that: In step 602, when the control plane security protection mode is determined, control plane security enabling indication information matching the control plane security protection mode is generated, to indicate the UE 1 whether to enable control plane integrity protection and whether to enable control plane confidentiality protection.

For example, if the control plane security protection mode is that control plane integrity protection is enabled, and control plane confidentiality protection is not enabled, the control plane security enabling indication information is used to indicate the UE 1 to enable control plane integrity protection and not enable control plane confidentiality protection.

Step 603: The UE 2 selects a security algorithm, where both the integrity protection algorithm and the confidentiality protection algorithm are non-null values.

The UE 2 selects, based on a security capability of UE 1 and a security capability of the UE 2, a non-null integrity protection algorithm from a list of supported integrity protection algorithms, and selects a non-null confidentiality protection algorithm from a list of supported confidentiality protection algorithms.

It should be noted that, in step 603, the integrity protection algorithm is selected based on enabling of integrity protection, and the confidentiality protection algorithm is selected based on enabling of confidentiality protection, which are irrelevant to the control plane security protection mode determined in step 602.

A sequence of performing step 602 and step 603 is not limited. Step 602 and step 603 may be performed at the same time, or step 602 may be performed before step 603, or step 603 may be performed before step 602.

Optionally, in step 604, the UE 1 and the UE 2 obtain a shared key. The shared key is $K_{NRP}$.

For an implementation process of step 604, refer to detailed descriptions of step 403 in the embodiment shown in FIG. 4. Details are not described herein again.

Step 605: The UE 2 sends a direct security mode command message to the UE 1. Correspondingly, the UE 1 receives the direct security mode command message from the UE 2.

The direct security mode command message includes control plane security enabling indication information and third algorithm indication information, and the third algorithm indication information indicates the security algorithm selected in step 603, including an algorithm identifier of a non-null integrity protection algorithm and an algorithm identifier of a non-null confidentiality protection algorithm.

If the control plane security enabling indication information indicates that control plane integrity and/or confidentiality protection is not enabled, a null integrity algorithm and/or a null confidentiality protection algorithm are/is selected by default, and optionally, an integrity protection algorithm and/or a confidentiality protection algorithm may not be selected or executed. An algorithm identifier of a non-null integrity protection algorithm included in the third algorithm indication information indicates an integrity protection algorithm used when control plane and/or user plane integrity protection is enabled. The algorithm identifier of the non-null confidentiality protection algorithm indicates an integrity protection algorithm to be used when control plane and/or user plane integrity protection is enabled.

Optionally, the direct security mode command message further includes a random number 2 generated by the UE 2, and the random number 2 may be used for generating an integrity protection key and/or a confidentiality protection key.

Optionally, the UE 2 stores the third algorithm indication information.

Step 606: The UE 1 determines a control plane security protection mode between the UE 1 and the UE 2 based on the control plane security enabling indication information.

Based on the premise that control plane integrity protection is enabled, when receiving a direct security mode command message, the UE 1 performs integrity protection verification on the direct security mode command message based on the shared key obtained in step 604.

When integrity protection verification on the direct security mode command message succeeds, the UE 1 determines a control plane security protection mode between the UE 1 and the UE 2 based on the control plane security enabling indication information, and performs control plane security protection based on the third algorithm indication information. If the control plane security enabling indication information received by the UE 1 indicates that control plane integrity and/or confidentiality protection is not enabled, a null integrity protection algorithm and/or a null confidentiality protection algorithm are/is selected by default as the control plane integrity protection algorithm and/or control plane confidentiality protection algorithm, and optionally, the integrity protection algorithm and/or the confidentiality protection algorithm may not be selected or executed. If the control plane security enabling indication information indicates that control plane integrity protection is enabled, an integrity protection algorithm indicated by an algorithm identifier of a non-null integrity protection algorithm included in the third algorithm indication information is used as a control plane integrity protection algorithm, for performing integrity protection on the control plane. If the control plane security enabling indication information indicates that control plane confidentiality protection is enabled, a confidentiality protection algorithm indicated by an algorithm identifier of a non-null confidentiality protection algorithm included in the third algorithm indication information is used as the control plane confidentiality protection algorithm, for confidentiality protecting the control plane.

For example, if the control plane security enabling indication information indicates to enable control plane integrity protection and not enable control plane confidentiality protection, the control plane security protection mode is that control plane integrity protection is enabled, and control plane confidentiality protection is not enabled. The UE 1 performs integrity protection on signaling by using a non-null integrity protection algorithm based on the third algorithm indication information, and uses a null confidentiality protection algorithm by default, or does not execute any algorithm, and does not confidentiality protect the signaling, so as to save computing resources.

In another example, if the control plane security enabling indication information indicates to enable control plane integrity protection and enable control plane confidentiality protection, the control plane security protection mode is that control plane integrity protection is enabled, and control plane confidentiality protection is enabled. The UE 1 performs, based on the third algorithm indication information, integrity protection on signaling by using a non-null integrity protection algorithm, and confidentiality protects the signaling by using a non-null confidentiality protection algorithm.

Optionally, the UE 1 stores the third algorithm indication information.

Step 607: The UE 1 sends a direct security mode accept message to the UE 2. Correspondingly, the UE 2 receives the direct security mode accept message from the UE 1.

The direct security mode accept message may include the user plane security policy of the UE 1 and may not include the security capability of the UE 1.

Step 608: The UE 2 determines that the user plane security protection mode between the UE 2 and the UE 1 includes that user plane confidentiality protection is enabled, and generates user plane security enabling indication information.

For an implementation process of step 608, refer to detailed descriptions of step 407 in the embodiment shown in FIG. 4. Details are not described herein again.

Step 609: The UE 2 sends a direct communication accept message to the UE 1. Correspondingly, the UE 1 receives the direct communication accept message from the UE 2.

Optionally, step 609 may also be that the UE 2 sends a direct rekeying response (direct rekeying Response) message to the UE 1. Correspondingly, the UE 1 receives the direct rekeying request from the UE 2.

Optionally, step 609 may also be that the UE 2 sends an RRC connection reconfiguration message to the UE 1. Correspondingly, the UE 1 receives the RRC connection reconfiguration message from the UE 2.

The direct communication accept message includes user plane security enabling indication information and indicates the UE 1 whether to enable user plane integrity protection and whether to enable user plane confidentiality protection.

Step 610: The UE 1 determines a user plane security protection mode between the UE 1 and the UE 2 based on the user plane security enabling indication information, and determines the user plane security algorithm based on the third algorithm indication information.

When receiving the direct communication accept message, the UE 1 determines the user plane security protection mode between the UE 1 and the UE 2 based on the user plane security enabling indication information. The UE 1 determines the user plane security algorithm based on the third algorithm indication information.

Uf the user plane security enabling indication information received by the UE 1 indicates that user plane integrity and/or confidentiality protection is not enabled, a null integrity protection algorithm and/or a null confidentiality protection algorithm may be selected by default as the user plane integrity protection algorithm and/or user plane confidentiality protection algorithm, and optionally, the integrity protection algorithm and/or the confidentiality protection algorithm may not be selected or executed. If the user plane security enabling indication information indicates that user plane integrity protection is enabled, an integrity protection algorithm indicated by an algorithm identifier of a non-null integrity protection algorithm included in the third algorithm indication information is used as a user plane integrity protection algorithm, for performing integrity protection on the user plane. If the user plane security enabling indication information indicates that user plane confidentiality protection is enabled, a confidentiality protection algorithm indicated by an algorithm identifier of a non-null confidentiality protection algorithm included in the third algorithm indication information is used as the user plane confidentiality protection algorithm, for confidentiality protecting the user plane.

For example, the user plane security protection mode is that user plane integrity protection is enabled, and user plane confidentiality protection is enabled. The UE 1 integrity and confidentiality protects first user plane data based on a non-null integrity protection algorithm and a non-null confidentiality protection algorithm that are indicated by the third algorithm indication information, so as to implement security protection on the user plane data.

In another example, the user plane security protection mode is that user plane integrity protection is not enabled, and user plane confidentiality protection is enabled. The UE 1 confidentiality protects first user plane data based on a non-null confidentiality protection algorithm indicated by the third algorithm indication information, so as to implement security protection on the user plane data. In this case, integrity protection may not be performed on the first user plane data, or a null integrity protection algorithm is used by default for performing integrity protection.

In the embodiment shown in FIG. 6, the control plane security enabling indication information indicates a control plane security protection mode, and the user plane security enabling indication information indicates a user plane security protection mode. When integrity protection and/or confidentiality protection are/is enabled, a corresponding non-null security algorithm is selected based on the third algorithm indication information for performing corresponding security protection, so that control plane security protection and user plane security protection can be implemented.

The embodiments shown in FIG. 4 to FIG. 6 are described by using a PC5 communication establishment procedure as an example. The embodiments may also be applied to a PC5 communication direct rekeying procedure. In the PC5 communication direct rekeying procedure, the direct communication request message may be replaced with a direct rekeying request message, and the direct communication accept message may be replaced with a direct rekeying response message.

The embodiments may also be applied to Uu communication. The UE 2 in FIG. 4 to FIG. 6 may be replaced with an access network device or a base station, the direct communication request message may be replaced with a connection establishment request message, the direct security mode command message may be replaced with an access stratum security mode command message, the direct security mode complete message may be replaced with an access stratum security mode complete message, and the direct communication accept message may be replaced with an RRC connection reconfiguration message.

The embodiments may also be applied to a non-access stratum (NAS) security protection procedure, for example, security protection between UE and an AMF network element. The UE 2 in FIG. 4 to FIG. 6 may be replaced with a core network device, the direct communication request message may be replaced with a connection establishment request message, the direct security mode command message may be replaced with a non-access stratum security mode command message, the direct security mode complete message may be replaced with a non-access stratum security mode complete message, and the direct communication accept message may be replaced with an RRC connection reconfiguration message.

In correspondence to the methods provided in the foregoing method embodiments, an embodiment may further provide a corresponding apparatus. The apparatus includes corresponding modules configured to perform the foregoing embodiments. The module may be software, hardware, or a combination of software and hardware.

Figure 7:
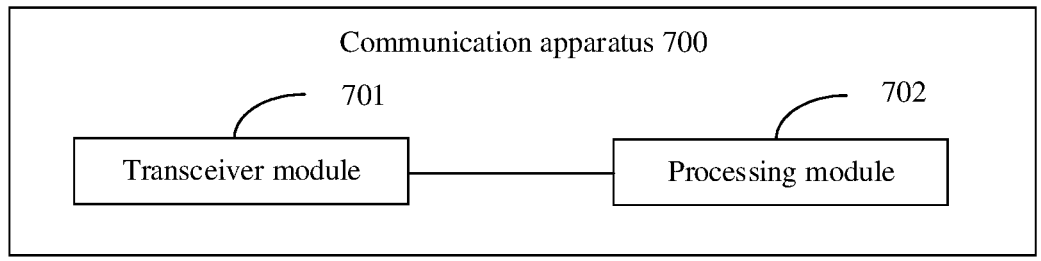
FIG. 7 is a schematic diagram of a structure of a communication apparatus according to an embodiment.

FIG. 7 is a schematic diagram of a structure of a communication apparatus according. A communication apparatus 700 shown in FIG. 7 includes a transceiver module 701 and a processing module 702.

The apparatus 700 may be a second device.

For example, the processing module 702 is configured to select a non-null user plane confidentiality protection algorithm based on a security capability of a first device and a security capability of the second device in a case in which user plane confidentiality protection between the second device and the first device is enabled and control plane confidentiality protection between the second device and the first device is not enabled.

The transceiver module 701 is configured to send a first message to the first device, where the first message includes first algorithm indication information indicating the user plane confidentiality protection algorithm.

This example is used for implementing functions of the UE 2 in the embodiments shown in FIG. 4 to FIG. 6.

The apparatus 700 may be a first device.

For example, the transceiver module 701 is configured to send a third message to a second device, where the third message includes a control plane security policy of the first device and a security capability of the first device; receive a fourth message from the second device, where the fourth message includes indication information indicating a null control plane confidentiality protection algorithm; send a second message to the second device, where the second message includes a user plane security policy of the first device; and receive a first message from the second device, where the first message includes first algorithm indication information indicating a non-null user plane confidentiality protection algorithm.

The processing module 702 is configured to confidentiality protect user plane data between the communication apparatus and the second device based on the user plane confidentiality protection algorithm indicated by the first algorithm indication information.

This example is used for implementing functions of the UE 1 in the embodiments shown in FIG. 4 to FIG. 6.

Figure 8:
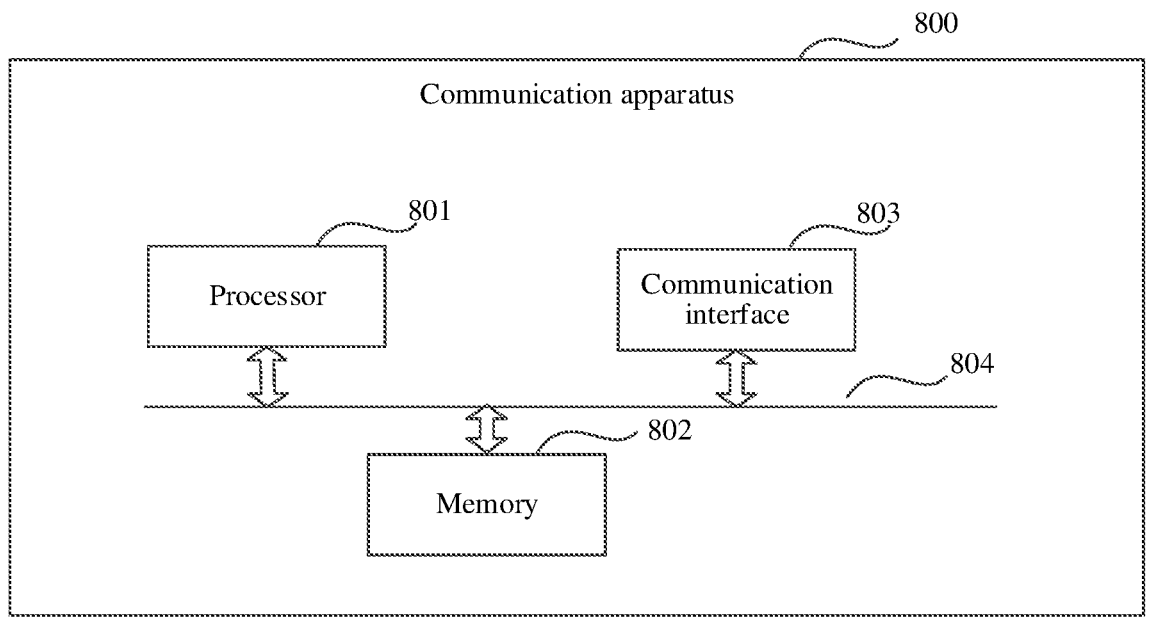
FIG. 8 is a schematic diagram of a structure of another communication apparatus according to an embodiment.

FIG. 8 is a schematic diagram of a structure of another communication apparatus. A communication apparatus 800 shown in FIG. 8 includes at least one processor 801 and a memory 802, and optionally, may further include a communication interface 803.

The memory 802 may be a volatile memory, for example, a random access memory. Alternatively, the memory may be a non-volatile memory, for example, a read-only memory, a flash memory, a hard disk (HDD), or a solid-state drive (SSD). Alternatively, the memory 802 is any other medium that can be configured to carry or store expected program code in a form of an instruction or a data structure and that can be accessed by a computer, but is not limited thereto. The memory 802 may be a combination of the foregoing memories.

A connection medium between the processor 801 and the memory 802 is not limited in this embodiment. In this embodiment, the memory 802 and the processor 801 are connected by a bus 804 in the figure. The bus 804 is represented by using a bold line in the figure. A manner of connection between other components is merely an example for description, and is not limited thereto. The bus 804 may be classified into an address bus, a data bus, a control bus, and the like. For ease of representation, only one bold line is used for representation in FIG. 8, but this does not mean that there is only one bus or only one type of bus.

The processor 801 may have data receiving and sending functions, and can communicate with another device. In the apparatus shown in FIG. 8, an independent data transceiver module, for example, a communication interface 803, may also be configured to send and receive data. When communicating with another device, the processor 801 may perform data transmission through the communication interface 803.

In an example, when the second device uses the form shown in FIG. 8, the processor in FIG. 8 may invoke computer-executable instructions stored in the memory 802, so that the UE 1 performs the method performed by the UE 2 in any one of the foregoing method embodiments.

In an example, when the first device uses the form shown in FIG. 8, the processor in FIG. 8 may invoke computer executable instructions stored in the memory 802, so that the UE 1 performs the method performed by the UE 1 in any one of the foregoing method embodiments.

Both functions/implementation processes of the processing module and the transceiver module in FIG. 7 may be implemented by the processor 801 in FIG. 8 by invoking computer-executable instructions stored in the memory 802. Alternatively, the function/implementation process of the processing module in FIG. 7 may be implemented by the processor 801 in FIG. 8 by invoking computer-executable instructions stored in the memory 802, and the function/implementation process of the transceiver module in FIG. 7 may be implemented by the communication interface 803 in FIG. 8.

The embodiments may further provide a communication system. The system may include the UE 1 and the UE 2 in FIG. 4 to FIG. 6.

It may be understood that, in some scenarios, some optional features in the embodiments may be independently implemented without depending on another feature, for example, a solution on which the optional features are currently based, to resolve a corresponding problem and achieve a corresponding effect. Alternatively, in some scenarios, the optional features are combined with other features based on requirements. Correspondingly, the apparatus provided in the embodiments may also correspondingly implement these features or functions. Details are not described herein.

A person skilled in the art may further understand that various illustrative logical blocks and steps that are listed in the embodiments may be implemented by using electronic hardware, computer software, or a combination thereof. Whether the functions are implemented by using hardware or software depends on a requirement of an entire system. A person skilled in the art may use various methods to implement the functions for corresponding applications, but it should not be considered that the implementation goes beyond the scope of the embodiments.

The embodiments may be implemented in various manners. For example, the technologies may be implemented by hardware, software, or a combination thereof. For hardware implementation, a processing unit configured to execute these technologies at a communication apparatus (for example, a base station, a terminal, a network entity, a core network element, or a chip) may be implemented in one or more general-purpose processors, digital signal processors (DSPs), digital signal processing devices, application-specific integrated circuits (ASICs), programmable logic devices, field programmable gate arrays (FPGAs), or other programmable logic apparatuses, discrete gates, or transistor logic, discrete hardware components, or any combination thereof. The general-purpose processor may be a microprocessor. Optionally, the general-purpose processor may alternatively be any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

It may be understood that the memory in the embodiments may be a volatile memory or a non-volatile memory or may include a volatile memory and a non-volatile memory. In addition, the non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) serving as an external cache. By way of example, but not limitation, many forms of RAMs are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct memory bus random access memory (DR RAM). It should be noted that the memory in the systems and methods includes, but is not limited to, these and any memory of another appropriate type.

The embodiments may further provide a non-transitory computer-readable medium storing a computer program. When the computer program is executed by a computer, functions of any one of the foregoing method embodiments are implemented.

The embodiments further provide a computer program product. When the computer program product is executed by a computer, functions of any one of the foregoing method embodiments are implemented.

All or some of the foregoing embodiments may be implemented by using software, hardware, firmware, or any combination thereof. When software is used to implement embodiments, all or some of the embodiments may be implemented in a form of a computer program product. The computer program product includes one or more computer instructions. When the computer instructions are loaded and executed on a computer, the procedures or functions according to the embodiments are all or partially generated. The computer may be a general-purpose computer, a dedicated computer, a computer network, or another programmable apparatus. The computer instructions may be stored in a non-transitory computer-readable storage medium or may be transmitted from a non-transitory computer-readable storage medium to another non-transitory computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The non-transitory computer-readable storage medium may be any available medium accessible by the computer, or a data storage device, for example, a server or a data center, integrating one or more available media. The available medium may be a magnetic medium (such as a floppy disk, a hard disk drive, or a magnetic tape), an optical medium (such as a digital video disc (DVD)), a semiconductor medium (such as a solid state disk (SSD)), or the like.

An "embodiment" means that particular features, structures, or characteristics related to this embodiment are included in at least one embodiment. Therefore, embodiments are not necessarily same embodiments. In addition, these particular features, structures, or characteristics may be combined in one or more embodiments in any appropriate manner. It may be understood that sequence numbers of the foregoing processes do not mean an execution sequence in the various embodiments. The execution sequence of the processes should be determined based on functions and internal logic of the processes and should not be construed as any limitation on the implementation processes of embodiments.

It may be understood that, "when . . . ", "if", and "if" all mean that the apparatus performs corresponding processing in an objective case, and are not intended to limit a time, and do not require that the apparatus performs a determining action during implementation, and do not mean that there is another limitation.

An element represented by using a singular number is intended to represent "one or more" but does not represent "one and only one", unless otherwise specified. Unless otherwise specified, "at least one" is intended to represent "one or more", and "a plurality of" is intended to represent "two or more".

In addition, the terms "system" and "network" may be used interchangeably. The term "and/or" describes only an association relationship for describing associated objects and represents that three relationships may exist. For example, A and/or B may represent the following three cases: only A exists, both A and B exist, and only B exists, where A may be a singular or plural, and B may be a singular or plural.

"Predefine" may be understood as "define", "predefine", "store", "pre-store", "pre-negotiate", "pre-configure", "solidify", or "pre-burn".

A person of ordinary skill in the art may understand that, for the purpose of convenient and brief description, for a detailed working process of the foregoing system, apparatus, and unit, refer to a corresponding process in the foregoing method embodiments. Details are not described herein again.

For same or similar parts in the embodiments, refer to each other. In embodiments and implementations/implementation methods/implementation methods in embodiments, unless otherwise specified or logically conflicting, terms and/or descriptions between different embodiments and between the implementations/implementation methods/implementation methods in embodiments are consistent and may be mutually referenced, features in different embodiments and implementations/implementation methods/implementation methods in embodiments may be combined to form new embodiments, implementations, implementation methods, or implementation methods according to internal logical relationships. The foregoing implementations are not intended to limit the scope of the embodiments.

The foregoing descriptions are merely implementations, but are not intended to limit the scope of the embodiments. Any variation or replacement readily figured out by a person skilled in the art shall fall within the scope of the embodiments.

What is claimed is:

1. A method for determining a user plane security algorithm, comprising:
    receiving, by a second terminal (UE 2), a direct communication request message from a first terminal (UE 1), wherein the direct communication request message comprises a security capability of the UE 1 and a control plane security policy of the UE 1;
    determining, by the UE 2, a control plane security protection mode between the UE 2 and the UE 1 based on the control plane security policy of the UE 1 and a control plane security policy of the UE 2; and
    when the control plane security protection mode is that control plane integrity protection is enabled and control plane confidentiality protection is not enabled:
        sending, by the UE 2, a direct security mode command message to the UE 1, and when receiving a direct security mode complete message carrying a user plane security policy of the UE 1 from the UE 1, regardless of the user plane security policy of the UE 1 and a user plane security policy of the UE 2, determining, by the UE 2, that user plane confidentiality protection between the UE 2 and the UE 1 is not enabled, wherein
    the direct security mode command message comprises a non-null integrity protection algorithm and a null confidentiality protection algorithm.

2. The method according to claim 1, further comprising: selecting, by the UE 2, the non-null integrity protection algorithm and the null confidentiality protection algorithm based on a security capability of the UE 2 and the security capability of the UE 1.

3. A method for determining a user plane security algorithm, comprising:

sending, by a first terminal (UE 1), a direct communication request message to a second terminal (UE 2), wherein the direct communication request message comprises a security capability of the UE 1 and a control plane security policy of the UE 1;

receiving, by the UE 1, a direct security mode command message from the UE 2, wherein the direct security mode command message comprises a non-null integrity protection algorithm and a null confidentiality protection algorithm, wherein the direct security mode command message is sent by the UE 2 when the UE 2 determines, based on the control plane security policy of the UE 1 and a control plane security policy of the UE 2, that a control plane security protection mode is that control plane integrity protection is enabled and control plane confidentiality protection is not enabled; and sending, by the UE 1 to the UE 2 based on the non-null integrity protection algorithm and the null confidentiality protection algorithm, a direct security mode complete message, wherein the direct security mode complete message comprises a user plane security policy of the UE 1.

4. A communication apparatus, comprising a processor coupled to a memory storing instructions and configured to execute the instructions to cause the communication apparatus to:

receive a direct communication request message from a first terminal (UE 1), wherein the direct communication request message comprises a security capability of the UE 1 and a control plane security policy of the UE 1;

and determine a control plane security protection mode between the communication apparatus and the UE 1 based on the control plane security policy of the UE 1 and a control plane security policy of the communication apparatus, wherein when the control plane security protection mode is that control plane integrity protection is enabled and control plane confidentiality protection is not enabled:

a transceiver module is further configured to:

send a direct security mode command message to the UE 1, and receive, from the UE 1, a direct security mode complete message carrying a user plane security policy of the UE 1, regardless of the user plane security policy of the UE 1 and a user plane security policy of a second terminal (UE 2), the processing module is further configured to determine that user plane confidentiality protection between the communication apparatus and the UE1 is not enabled, wherein the direct security mode command message comprises a non-null integrity protection algorithm and a null confidentiality protection algorithm.

5. The communication apparatus according to claim 4, wherein the instructions further cause the apparatus to select the non-null integrity protection algorithm and the null confidentiality protection algorithm based on a security capability of the communication apparatus and the security capability of the UE 1.

* * * * *